United States Patent
Oikawa

(10) Patent No.: US 8,626,388 B2
(45) Date of Patent: Jan. 7, 2014

(54) SPRUNG MASS DAMPING CONTROL SYSTEM OF VEHICLE, AND VEHICLE PROVIDED WITH SAID SYSTEM

(75) Inventor: Yoshitaka Oikawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 45 days.

(21) Appl. No.: 13/319,204

(22) PCT Filed: May 11, 2010

(86) PCT No.: PCT/IB2010/001072
§ 371 (c)(1),
(2), (4) Date: Nov. 7, 2011

(87) PCT Pub. No.: WO2010/131093
PCT Pub. Date: Nov. 18, 2010

(65) Prior Publication Data
US 2012/0053790 A1 Mar. 1, 2012

(30) Foreign Application Priority Data
May 13, 2009 (JP) ................................. 2009-116942

(51) Int. Cl.
*B60G 17/018* (2006.01)
*B60T 7/12* (2006.01)
*F16M 1/00* (2006.01)

(52) U.S. Cl.
USPC ............... 701/37; 701/70; 701/103; 701/104; 267/140.14; 267/160; 188/378

(58) Field of Classification Search
USPC ......... 701/37, 70, 103, 104; 267/140.14, 160; 188/378
See application file for complete search history.

(56) References Cited

U.S. PATENT DOCUMENTS 5,226,500 A * 7/1993 Doi et al. ..................... 180/312
5,236,182 A * 8/1993 Aoki et al. ............... 267/140.14

(Continued)

FOREIGN PATENT DOCUMENTS

EP 1 632 382 A2 3/2006
EP 2 078 653 A1 7/2009

(Continued)

OTHER PUBLICATIONS

International Search Report issued in International Application No. PCT/IB2010/001072 dated Sep. 6, 2010.

(Continued)

*Primary Examiner* — James Trammell
*Assistant Examiner* — Majdi Alsomiri
(74) *Attorney, Agent, or Firm* — Oliff & Berridge, PLC

(57) ABSTRACT

A sprung mass damping control system of a vehicle, which suppresses sprung mass vibration generated in a vehicle body by adjusting a driving control amount of a drive source (the second motor-generator), includes a spring vibration control amount calculating device that sets a sprung mass damping control amount for suppressing the sprung mass vibration, a drive source control device (a motor-generator control device) that executes sprung mass damping control by controlling the driving control amount of the drive source to realize the sprung mass damping control amount, and a sprung mass damping control amount adjusting apparatus (a sprung mass damping control amount responsiveness compensating portion) that adjusts the phase of a sprung mass damping control signal related to the sprung mass damping control amount according to the situation. A vehicle is provided with this sprung mass damping control system.

5 Claims, 9 Drawing Sheets

(56) References Cited

U.S. PATENT DOCUMENTS

| | | | |
|---|---|---|---|
| 5,537,967 | A | 7/1996 | Tashiro et al. |
| 7,571,712 | B2 * | 8/2009 | Kuroda et al. ............... 123/434 |
| 2005/0049761 | A1 | 3/2005 | Kataoka et al. |
| 2005/0234620 | A1 | 10/2005 | Roll et al. |
| 2006/0041353 | A1 * | 2/2006 | Sawada et al. ................. 701/37 |
| 2006/0052908 | A1 * | 3/2006 | Matsumoto et al. ............. 701/1 |
| 2010/0127442 | A1 * | 5/2010 | Muragishi et al. ....... 267/140.14 |
| 2010/0198485 | A1 * | 8/2010 | Ohtsuka et al. ............. 701/103 |
| 2010/0228465 | A1 * | 9/2010 | Itabashi ....................... 701/104 |
| 2010/0241305 | A1 * | 9/2010 | Itabashi et al. ................ 701/34 |

FOREIGN PATENT DOCUMENTS

| | | |
|---|---|---|
| EP | 2 204 564 A1 | 7/2010 |
| JP | A-7-91306 | 4/1995 |
| JP | A-09-220919 | 8/1997 |
| JP | A-2004-168148 | 6/2004 |
| WO | WO 2009/057750 A1 | 5/2009 |

OTHER PUBLICATIONS

Written Opinion issued in International Application No. PCT/IB2010/001072 dated Sep. 6, 2010.

* cited by examiner

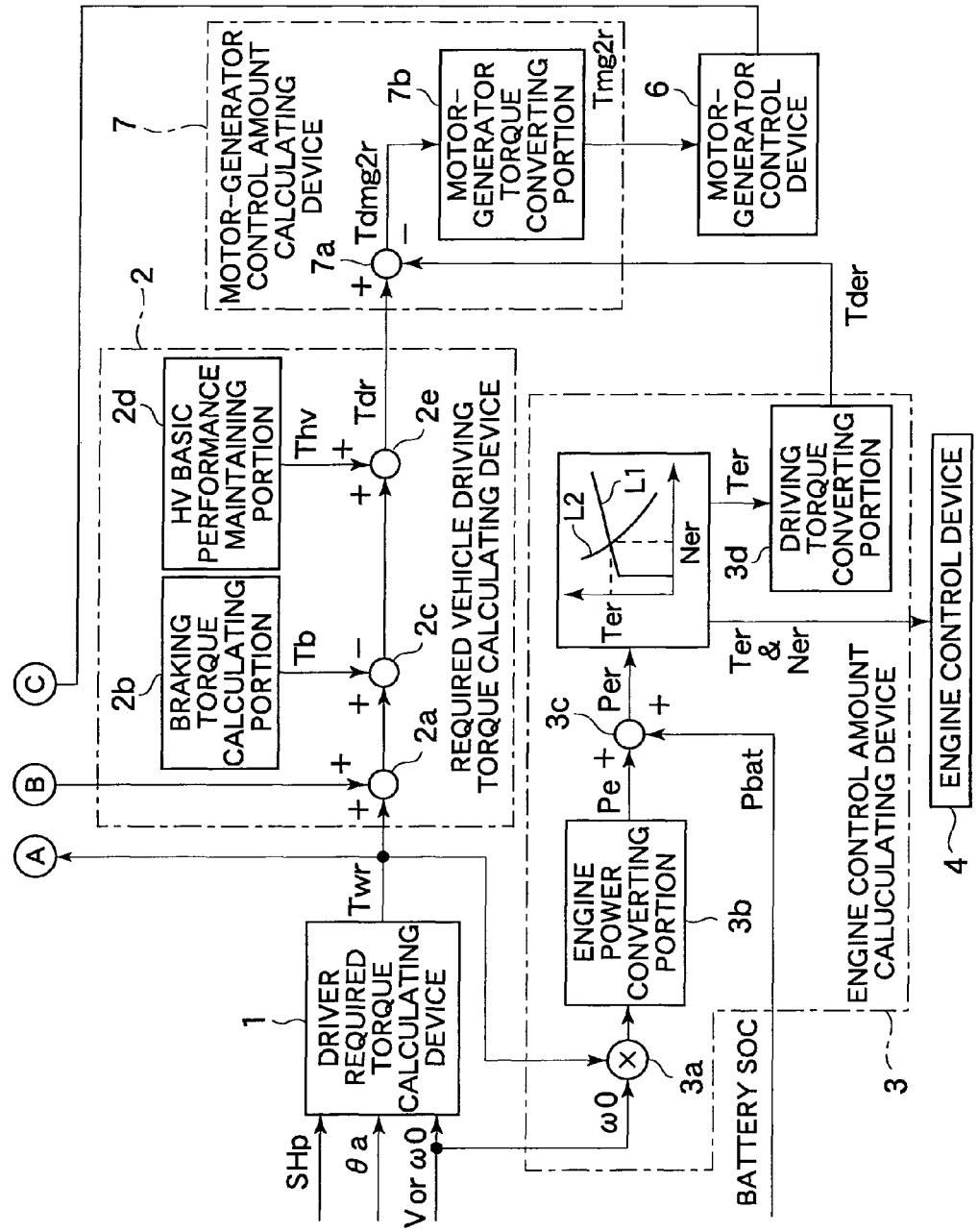
F I G. 4B

F I G . 9

| FREQUENCY / AMPLITUDE | f1 ~ f2 | f2 ~ f3 | f3 ~ f4 | f4 ~ f5 |
|---|---|---|---|---|
| A1 ~ A2 | | | | |
| A2 ~ A3 | | | ///// | ///// |
| A3 ~ A4 | | ///// | ///// | ///// |
| A4 ~ A5 | | ///// | ///// | ///// |

US 8,626,388 B2

SPRUNG MASS DAMPING CONTROL SYSTEM OF VEHICLE, AND VEHICLE PROVIDED WITH SAID SYSTEM

INCORPORATION BY REFERENCE

The disclosure of Japanese Patent Application No. 2009-116942 filed on May 13, 2009, including the specification, drawings and abstract is incorporated herein by references in its entirety.

BACKGROUND OF THE INVENTION

1. Field of the Invention

The invention relates to a sprung mass damping control system of a vehicle, which suppresses sprung mass vibration generated in the body of a vehicle. The invention also relates to a vehicle provided with that sprung mass damping control system.

2. Description of the Related Art

Technology referred to as sprung mass damping control that suppresses sprung mass vibration generated in a vehicle body using predetermined vibration damping means is well known. For example, Japanese Patent Application Publication No. 2004-168148 (JP-A-2004-168148) describes a technology that controls the driving force of a vehicle in order to suppress sprung mass vibration in the vehicle. In the technology described in JP-A-2004-168148, the driving force is controlled by increasing or decreasing the engine torque. To perform this control, these technologies increase or decrease the engine torque as necessary by adjusting the intake air amount, the fuel injection amount, and the ignition timing and the like of the engine.

Incidentally, Japanese Patent Application Publication No. 9-220919 (JP-A-9-220919) describes technology in which the phase of a control command signal of active suspension is adjusted.

The engine which is a drive source operates in various states, e.g., at various speeds, while running. Therefore, in any given operating state, the wheel speed of the driving wheels is affected by the output of the engine and thus fluctuates. As a result, the output responsiveness of a sprung mass damping control amount (i.e.; a control amount for suppressing sprung mass vibration) that is obtained using this wheel speed may decrease. Also, it is conceivable that sprung mass damping control may be executed using the output from the motor-generator which is also a drive source. However, the output responsiveness of the sprung mass damping control amount obtained using this wheel speed may end up decreasing depending on the waveform signal modulation method when controlling that motor-generator. Furthermore, in a vehicle according to related art, the responsiveness of the drive source may also change for a reason other than those described here, which may result in reduced output responsiveness of the sprung mass damping control amount. In this way, in a vehicle according to related art, the responsiveness of the drive source may decrease in a given situation, which may end up reducing the output responsiveness of the sprung mass damping control amount. As a result, the damping effect of sprung mass damping control may decrease. That is, there is room for improvement in sprung mass damping control of the related art.

SUMMARY OF THE INVENTION

Thus, in view of the foregoing problems, the invention provides a sprung mass damping control system of a vehicle, which is capable of inhibiting a decrease in the precision of sprung mass damping control, as well as a vehicle provided with that sprung mass damping control system.

Therefore, a first aspect of the invention relates to a sprung mass damping control system of a vehicle, which suppresses sprung mass vibration generated in a vehicle body by adjusting a driving control amount of a drive source. This sprung mass damping control system includes a spring vibration control amount calculating device that sets a sprung mass damping control amount for suppressing the sprung mass vibration, a drive source control device that executes sprung mass damping control by controlling the driving control amount of the drive source to realize the sprung mass damping control amount, and a sprung mass damping control amount adjusting apparatus that adjusts the phase or the amplitude of a sprung mass damping control signal related to the sprung mass damping control amount according to the situation.

In this case, in the sprung mass damping control system described above, the drive source control device may execute sprung mass damping control by controlling a motor-generator control amount of a motor-generator that is driven by a waveform signal, or a motor control amount of a motor or a generator capable of operating as a motor that is driven by a waveform signal, and the sprung mass damping control amount adjusting apparatus may adjust the phase of the sprung mass damping control signal related to the sprung mass damping control amount according to the waveform signal.

Also in the sprung mass damping control system described above, the drive source control device may execute sprung mass damping control by controlling a motor-generator control amount of a motor-generator that is driven by a waveform signal, or a motor control amount of a motor or a generator capable of operating as a motor that is driven by a waveform signal, and the sprung mass damping control amount adjusting apparatus may adjust the amplitude of the sprung mass damping control signal related to the sprung mass damping control amount according to the waveform signal.

Also in the sprung mass damping control system described above, the drive source control device may execute sprung mass damping control by controlling a motor-generator control amount of a motor-generator, the waveform signal modulation method of which is able to be switched, or a motor control amount of a motor or a generator capable of operating as a motor, the waveform signal modulation method of which is able to be switched, and the sprung mass damping control amount adjusting apparatus may adjust the phase or the amplitude of the sprung mass damping control signal related to the sprung mass damping control amount according to the modulation method.

Also in the sprung mass damping control system described above, the drive source control device may execute sprung mass damping control by controlling a motor-generator control amount of a motor-generator, the waveform signal modulation method of which is able to be switched, or a motor control amount of a motor or a generator capable of operating as a motor, the waveform signal modulation method of which is able to be switched, and the sprung mass damping control amount adjusting apparatus may adjust the sprung mass damping control amount when at least one of the amplitude or the frequency of the sprung mass damping, control signal according to the sprung mass damping control amount is within a predetermined range.

In this case, the sprung mass damping control amount adjusting apparatus may reduce the sprung mass damping control amount when the modulation method is an overmodulation PWM control method and at least one of the amplitude or the frequency of the sprung mass damping control signal according to the sprung mass damping control amount is within the predetermined range.

Also, another aspect of the invention relates to a vehicle which suppresses at least a fluctuation in wheel speed due to bumps and dips in a road surface by outputting a driving control amount of a drive source over which a waveform signal based on that fluctuation has been superimposed. In this vehicle, the phase of the waveform signal is advanced when the responsiveness of at least one of the drive source or a driving control amount transmitting apparatus that transmits a driving control amount output from the drive source to a driving wheel is low compared with when that responsiveness is high.

The sprung mass damping control system of a vehicle and a vehicle provided with this sprung mass damping control system according to the invention compensates for variation in the output responsiveness of the sprung mass damping control amount by appropriately adjusting the sprung mass damping control amount, thereby enabling the desired sprung mass damping control to be executed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 4A and 4B are views in the form of control blocks showing frame formats of an example of the functional structure of a sprung mass damping control system;

FIG. 9 is an example of map data for determining whether the sprung mass damping control amount adjusting gain needs to be adjusted, according to the second example embodiment.

DETAILED DESCRIPTION OF EMBODIMENTS

Example embodiments of the sprung mass damping control system of a vehicle and a vehicle provided with this sprung mass damping control system according to the invention will be described in greater detail below with reference to the accompanying drawings, but the invention is not limited to these example embodiments.

First, a sprung mass damping control system of a vehicle and a vehicle provided with that sprung mass damping control system according to a first example embodiment of the invention will be described with reference to FIGS. 1 to 7.

A vehicle to which the sprung mass damping control system according to the first example embodiment can be applied is a vehicle that is provided with at least a motor-generator as a drive source. The vehicle may be a so-called hybrid vehicle that also has an engine as a drive source, or an electric vehicle that has only a motor-generator as the drive source. In this first example embodiment, the vehicle described is a hybrid vehicle.

Figure 1:
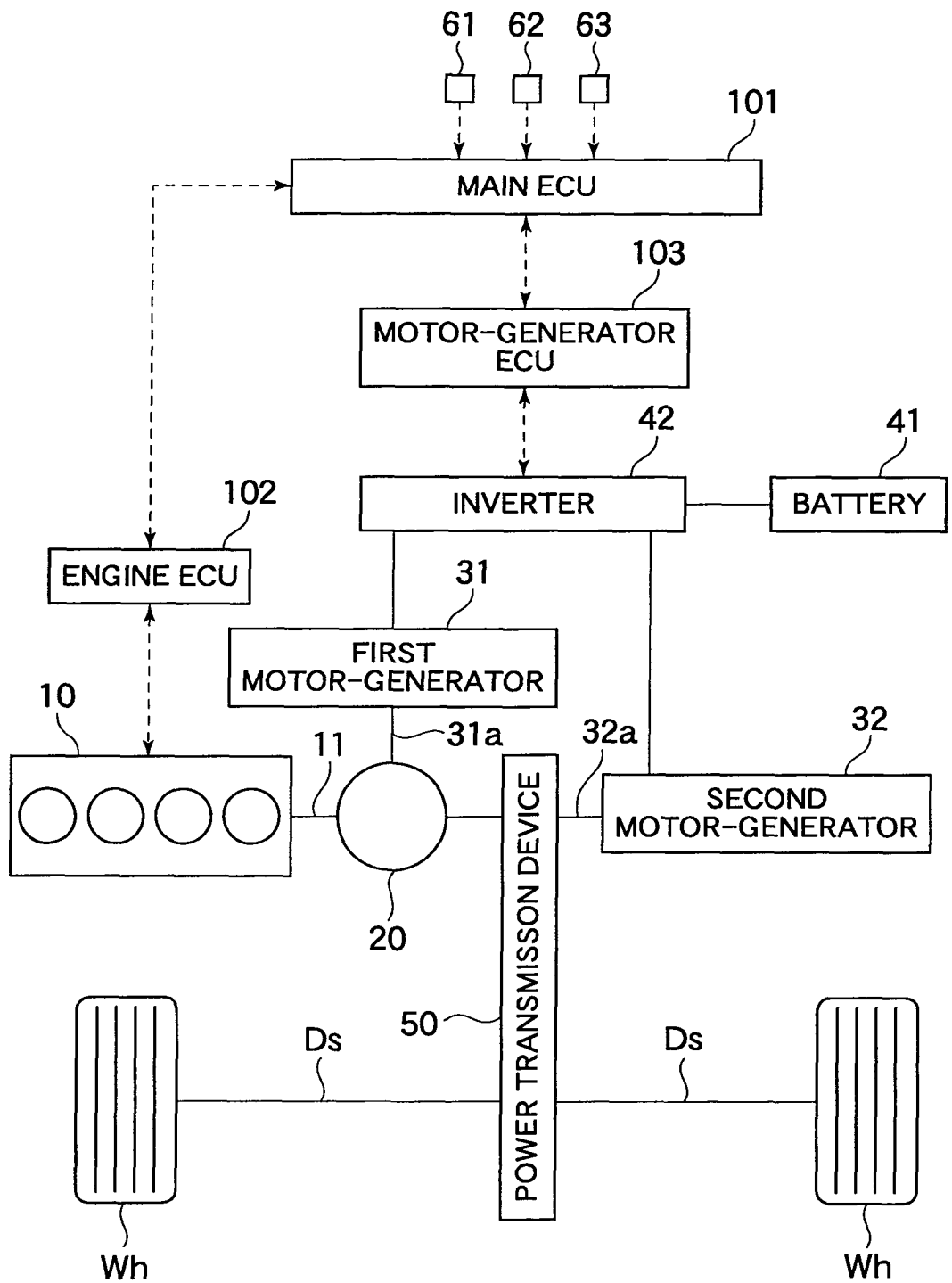
FIG. 1 is a diagram of one example of a vehicle to which the sprung mass damping control system according to the invention is applied.

The hybrid vehicle described here is provided with an engine 10, a power split device 20, a first motor-generator 31, a second motor-generator 32, and a power transmission device 50, as shown in FIG. 1. The power split device 20 splits (i.e., distributes) engine torque output from the engine 10. The first motor-generator 31 operates mainly as a generator using some of the engine torque distributed by the power split device 20 (hereinafter this torque will be referred to as "first split torque"). The second motor-generator 32 operates mainly as a motor using the power generated by the first motor-generator 31 and/or power from a battery 41. The power transmission device 50 transmits output torque from the drive source to driving wheels Wh and Wh (i.e., drive shafts (Ds and Ds).

The hybrid vehicle is also provided with an electronic control unit 101 that controls the operation of the entire vehicle (hereinafter, this electronic control unit will be referred to as the "main ECU 101"), an electronic control unit 102 that controls the operation of the engine 10 (hereinafter, this electronic control unit will be referred to as the "engine ECU 102"), and an electronic control unit 103 that controls the operation of both the first motor-generator 31 and the second motor-generator 32 (hereinafter, this electronic control unit will be referred to as the "motor-generator ECU 103"). The main ECU 101 is connected to the engine ECU 102 and the motor-generator ECU 103, such that signals and commands, such as detections signals from various sensors and control commands, can be transmitted between them. The main ECU 101, the engine ECU 102, and the motor-generator ECU 103 are each formed of, for example, a CPU (Central Processing Unit), ROM (Read Only Memory) in which predetermined control programs and the like are stored in an advance, RAM (Random Access Memory) that temporarily stores the calculation results of the CPU, and backup RAM which stores information such as map data that has been prepared in advance, none of which are shown. The sprung mass damping control system of a vehicle according to this first example embodiment is formed of the main ECU 101, the engine ECU 102, and the motor-generator ECU 103.

The engine 10 is a heat engine such as an internal combustion engine or an external combustion engine that converts heat energy into mechanical energy. As an example in this case, the engine 10 is an internal combustion engine that is a reciprocating piston engine in which pistons are forced back and forth by combusting fuel in a Combustion chamber, not shown, so as to generate mechanical power (i.e., engine torque) in an output shaft (i.e., a crankshaft) 11.

The engine 10 is provided with an electronically controlled throttle device, a fuel injection device, and an ignition device, and the like, none of which are shown. These devices are controlled by the engine ECU 102. In this first example embodiment, the main ECU 101 sets the control amount of the engine 10 (i.e., the engine control amount as the driving control amount), and the engine ECU 102, which receives information regarding the engine control amount from the main ECU 101, controls the engine 10. That is, the main ECU 101 includes an engine control amount calculating device that sets the engine control amount, and the engine ECU 102 includes an engine control device that serves as a drive source control device that controls the engine 10. The engine control amount refers to the required engine torque Ter to be generated at the output shaft 11, and the required engine speed Ner when generating this required engine torque Ter.

Figure 2:
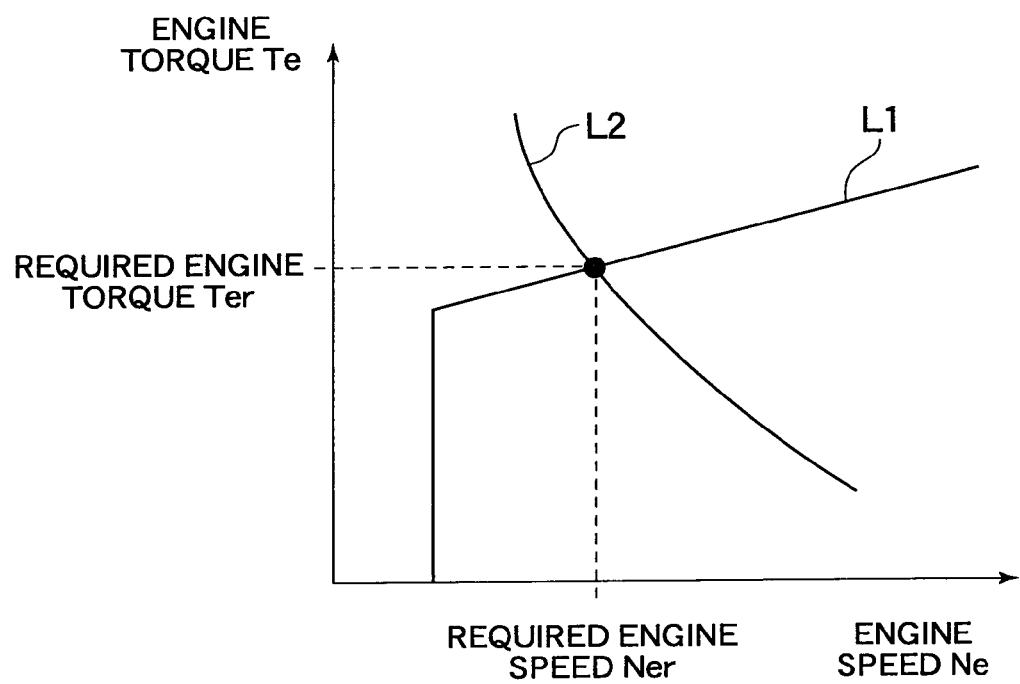
FIG. 2 is a view of an example of an engine control map.

The engine control amount calculating device of the main ECU 101 sets the required engine torque Ter and the required engine speed Ner using the engine control map shown in FIG. 2, for example.

The engine control map shown in FIG. 2 is one example of map data indicative of operating points of the engine 10 that correspond to the engine speed Ne and the engine torque Te, for deriving operating points (Ne and Te) for generating required engine power Per while maintaining fuel efficiency. This engine control map has a fuel efficiency line L1 plotted by combinations of the engine speed Ne and the engine torque Te which exhibit good fuel efficiency characteristics of the engine 10, and a constantly required engine power line L2 plotted by combinations of the engine speed Ne and the engine torque Te which generate the required engine power Per. The engine control amount calculating device obtains as an operating point the point of intersection of the fuel efficiency line L1 and the constantly required engine power line L2 according to the required engine power Per on this engine control map, and sets the engine speed Ne and the engine torque Te at that point of intersection as the required engine speed Ner and the required engine torque Ter.

Here, this required engine power Per is obtained based on the driving torque Twr at the driving wheels Wh and Wh (i.e., the drive shafts Ds and Ds) corresponding to the driving force required by the driver (hereinafter, referred to as the "driver required torque"), the angular velocity $\omega 0$ of the driving wheels Wh and Wh which is detected by a wheel speed sensor 62 or the vehicle speed V which is detected by a vehicle speed sensor 61, and the SOC (state-of-charge) of the battery 41. The driving force required by the driver refers to the accelerator operation amount $\theta a$ detected by an accelerator operation amount sensor 63, for example. Also, the motor-generator ECU 103 ascertains the SOC of the battery 41 via an inverter 42, and outputs this information to the main ECU 101. The required engine power Per is calculated by the engine control amount calculating device of the main ECU 101. Incidentally, in an FR (front engine, rear drive) vehicle, the rotation speed of a propeller shaft, not shown, or the like may be used instead of the vehicle speed V and the angular velocity $\omega 0$.

The main ECU 101 is connected to the vehicle speed sensor 61, the wheel speed sensor 62, and the accelerator operation amount sensor 63. Also, the main ECU 101 receives information regarding the shift position SHp of a transmission from a shift position sensor 64. In this hybrid vehicle, the power split device 20 functions as the transmission. The driver required torque calculating device of the main ECU 101 obtains the driver required torque Twr based on the accelerator operation amount $\theta a$, the shift position SHp, and the vehicle speed V or the angular velocity $\omega 0$ of the driving wheels Wh and Wh. Also, when using the detection signal from the vehicle speed sensor 61, the engine control amount calculating device of the main ECU 101 obtains the angular velocity $\omega 0$ of the driving wheels Wh and Wh (i.e., the drive shafts Ds and Ds) based on that detection signal. The engine control amount calculating device then obtains the required engine power Per by multiplying the driver required torque Twr by the angular velocity $\omega 0$, and adding a correction power Pbat that corresponds to the information of the SOC of the battery 41 to the product. This correction power Pbat results in an increase in the amount of the first split torque by the amount of the correction power Pbat, and thus an increase in the amount of power generated by the first motor-generator 31 by the amount of the correction power Pbat. Therefore, this correction power Pbat increases as the required SOC of the battery 41 increases, for example.

The engine control amount calculating device outputs information related to the required engine torque Ter and the required engine speed Ner calculated and set as described above to the engine ECU 102. The engine control device of the engine ECU 102 controls the throttle opening amount and the like to realize the set required engine torque Ter and the set required engine speed Ner. As a result, the engine 10 rotates the output shaft 11 at the required engine speed Ner and generates the required engine torque Ter.

The first and second motor-generators 31 and 32 are structured as well-known synchronous motor-generators able to be driven as a motor or a generator, and send or receive power to or from the battery 41 via the inverter 42. The inverter 42 is controlled by a motor-generator control device, which functions as a drive source control device, of the motor-generator ECU 103.

For example, when generating the required vehicle driving torque Tdr as the required vehicle driving amount at the driving wheels Wh and Wh using only the motor-generator torque (more specifically, the output torque generated by the motor-generator operating as a motor), the motor-generator control amount calculating device of the main ECU 101 obtains a target motor-generator torque for the second motor-generator 32 based on that required vehicle driving torque Tdr and the gear ratio of the power transmission device 50. This target motor-generator is the required motor-generator torque Tmg2r of the second motor-generator 32. The motor-generator control amount calculating device then instructs the motor-generator ECU 103 to control the inverter 42 so that the second motor-generator 32 generates that required motor-generator torque Tmg2r. As a result, the second motor-generator 32 outputs that required motor-generator torque Tmg2r (in this case, the output torque of the motor-generator operating as a generator), and generates the required vehicle driving torque Tdr at the driving wheels Wh and Wh.

The required vehicle driving torque Tdr refers to the vehicle driving torque ultimately required at the driving wheels Wh and Wh, and is set by the required vehicle driving torque calculating device, which serves as the required vehicle driving amount calculating device, of the main ECU 100. For example, the required vehicle driving torque Tdr is mainly torque that takes into account the HV basic performance compensation amount required to compensate for a decrease in the basic performance required of the hybrid vehicle (hereinafter, referred to as the "HV basic performance"). This HV basic performance includes, for example, drivability, gear grinding noise and vibration performance (so-called "sound vibration performance"), battery input/output, power input/output between the engine 10 and the motor-generator (i.e., the first and second motor-generators 31 and 32) in order to keep the battery input/output within a specified range, and the protection of parts and the like. Also, the HV basic performance compensation amount is a value set according to the difference between the current vehicle state and the HV basic performance, and is for example a correction coefficient or a correction value necessary for maintaining the HV basic performance. The required vehicle driving torque calculating device includes an HV basic performance maintaining portion. If the vehicle state falls outside of the HV basic performance, this HV basic performance maintaining portion sets the HV basic performance compensation amount according to the difference between the current vehicle state and the HV basic performance. This HV basic performance compensation amount is prepared as map data in advance, and may be derived from this map data using the current vehicle state, e.g., the vehicle speed and the SOC of the battery 41 or the like, as parameters. The required vehicle driving torque calculating device multiplies the driver required torque Twr by a correction coefficient, or divides the driver required torque Twr by a correction coefficient, or adds a correction coefficient to the driver required torque Twr, or subtracts a correction coefficient from the driver required torque Twr, and sets a required vehicle driving torque Tdr in which that driver required torque Twr has been increased or decreased to a value that can maintain the fly basic performance. Incidentally, the hybrid vehicle may also be a four-wheel-drive vehicle in which either the front wheels or the rear wheels are driven by the engine and the other wheels are driven by the motor-generator.

Here, in this hybrid vehicle, braking force may be applied to the controlled wheels such as the driving wheels Wh and Wh to stabilize the vehicle behavior. Also, the driver may switch from an accelerator operation to a brake operation. In this case, braking torque Tb corresponding to the required braking force is applied to the driving wheels Wh and Wh. Therefore, when braking force is generated, the braking torque Tb is subtracted from the driver required torque Twr and the HV basic performance compensation amount is determined according to this subtracted value.

The power split device 20 is formed as a planetary gear set that has a sun gear which is a gear with external teeth, a ring gear which is a gear with internal teeth that is arranged concentric with the sun gear, a plurality of pinions that are in mesh with both the sun gear and the ring gear, and a planetary carrier that pivotally and rotatably retains these pinions, none of which are shown. This power split device 20 performs a differential operation, with the sun gear, the ring gear, and the planetary carrier serving as rotating elements. The sun gear is coupled to a rotating shaft 31a of the first motor-generator 31. The ring gear is coupled via a ring gear shaft to a reduction gear of the power transmission device 50 which is formed of a reduction gear and a differential gear unit and the like. In this power transmission device 50, the reduction gear is coupled to a rotating shaft 32a of the second motor-generator 32, and the differential gear unit is coupled to the drive shafts Ds and Ds of the driving wheels Wh and Wh. Also, the planetary carrier is coupled to the output shaft 11 of the engine 10.

In the power split device 20, the engine torque is distributed and transmitted via the planetary carrier to the sun gear and the ring gear which are in mesh with the pinions that are supported on the planetary carrier. This distribution ratio is determined by the gear ratio of the sun gear and the ring gear. The first split torque is transmitted to the sun gear, and the rest of the engine torque (hereinafter, referred to as the "second split torque") is transmitted to the ring gear.

The first split torque that is transmitted to the sun gear makes the first motor-generator 31 operate as a generator. At this time, the power generated by the first motor-generator 31 is output to the inverter 42, after which it is used to charge the battery 41 or supplied to the second motor-generator 32. The second split torque that is transmitted to the ring gear is used to directly drive the drive shafts Ds and Ds via the power transmission device 50. Also, this power split device 20 can also be used to control the amount of engine torque by adjusting the motor-generator torque Tmg1 of the first motor-generator 31.

Figure 3:
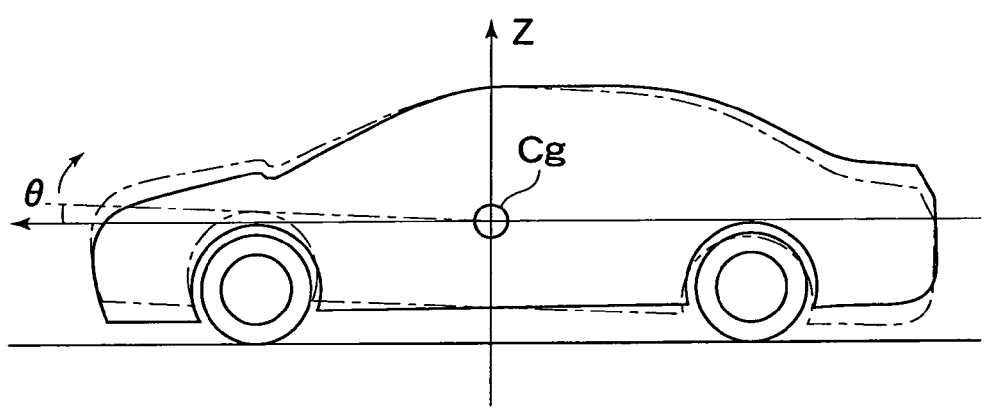
FIG. 3 is a view illustrating state variables of sprung mass vibration of the sprung mass damping control system and the vehicle according to the invention.

In this hybrid vehicle, when external force or torque (i.e., disturbance) is applied to the wheels of the hybrid vehicle due to dips and bumps in the road and the like when the hybrid vehicle is traveling, that external force and the like is transmitted to the vehicle body via the wheels and suspension, not shown. Therefore, input from the road while the vehicle is traveling may cause vibrations of 1 to 4 Hz, or more accurately, approximately 1.5 Hz, in the vehicle body via the wheels and suspension. This sprung mass vibration has two components, i.e., a component in the vertical direction (Z direction) of the hybrid vehicle (the vehicle center of gravity Cg, strictly speaking) (hereinafter, this component will be referred to as "bounce vibration"), and a component in the pitch direction ($\theta$ direction) about the vehicle center of gravity Cg (hereinafter, this component will be referred to as "pitch vibration"), as shown in FIG. 3. When sprung mass vibration occurs, at least one of bounce vibration or pitch vibration is generated. Incidentally, FIG. 3 shows an example of the posture of the hybrid vehicle during nose lift. Also, similar sprung mass vibration (i.e., at least one of bounce vibration or pitch vibration) may also be generated in the hybrid vehicle if the engine 10 or the first and second motor-generators 31 and 32, which serve as vehicle drive apparatuses, start to operate based on the driving force required by the driver or the like such that there is a fluctuation in the wheel torque (i.e., the wheel driving force) of the driving wheels Wh and Wh.

The hybrid vehicle according to this first example embodiment has a sprung mass damping control system that performs sprung mass damping control to suppress sprung mass vibration. The sprung mass damping control system in this first example embodiment aims to suppress sprung mass vibration generated in the vehicle body by adjusting the motor-generator torque Tmg2 of the second motor-generator 32 to increase or decrease the wheel torque of the driving wheels Wh and Wh. This sprung mass damping control system is formed by the main ECU 101, the engine ECU 102, and the motor-generator ECU 103, as described above.

Figure 4A:
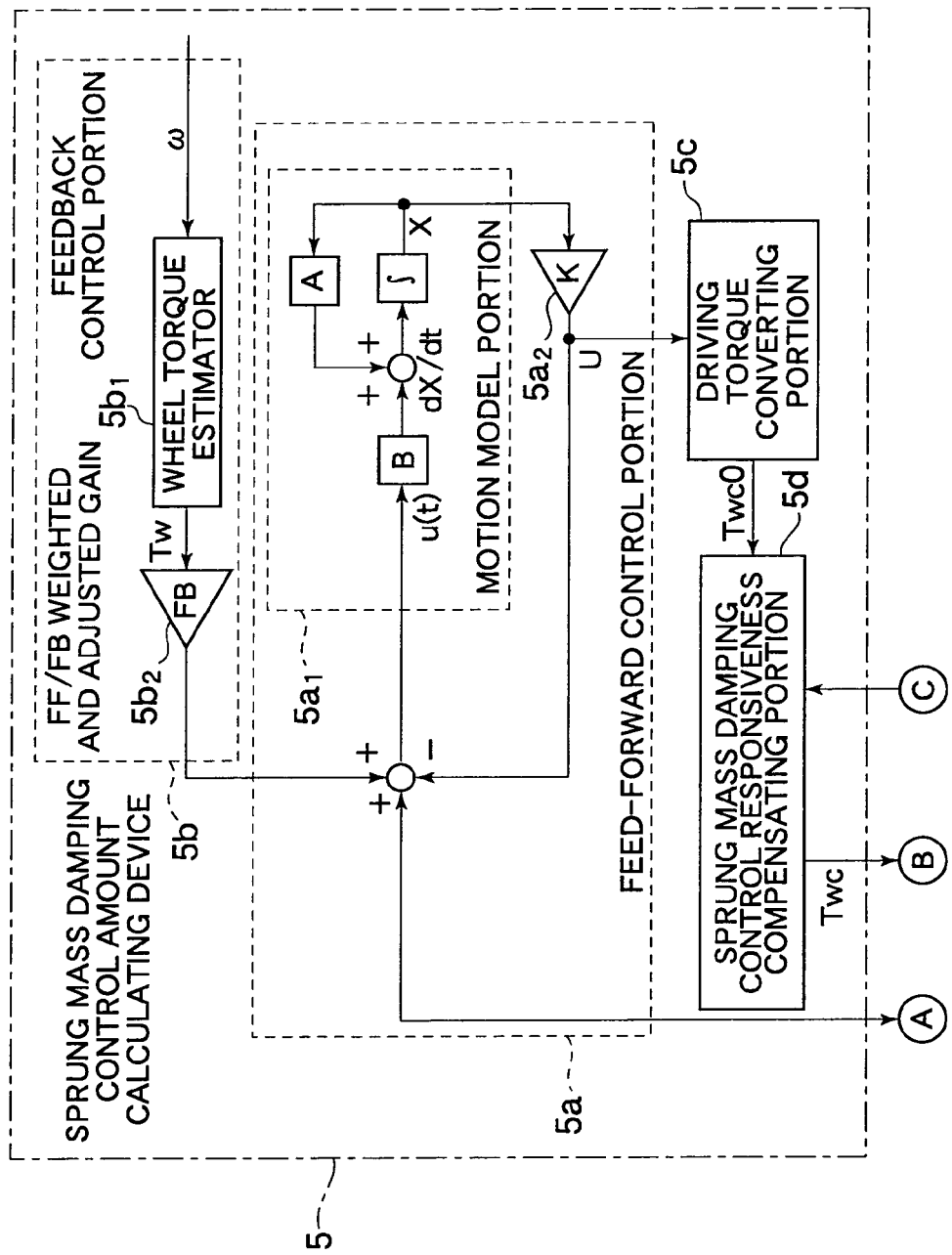

FIGS. 4A and 4B are control block diagrams showing frame formats of the structure of this sprung mass damping control system.

This sprung mass damping control system has a driver required torque calculating device 1, a required vehicle driving torque calculating device 2, an engine control amount calculating device 3, an engine controlling device 4, a sprung mass damping control amount calculating device 5, a motor-generator controlling device 6, and a motor-generator control amount calculating device 7. The driver required torque calculating device 1 sets the driver required torque Twr at the driving wheels Wh and Wh corresponding to the driving force required by the driver. The required vehicle driving torque calculating device 2 obtains the vehicle driving torque (i.e., the required vehicle driving torque Tdr) ultimately required at the driving wheels Wh and Wh of the hybrid vehicle. The engine control amount calculating device 3 sets the engine control amount (i.e., the required engine torque Ter and the required engine speed Ner) corresponding to that driver required torque Twr and the like. The engine control device 4 controls the engine 10 based on that engine control amount. The sprung mass damping control amount calculating device 5 sets the sprung mass damping control amount for suppressing sprung mass vibration of the vehicle body (i.e., bounce vibration and pitch vibration). The motor-generator control device 6 functions as a sprung mass damping control executing device that executes sprung mass damping control by adjusting the motor-generator torque. The motor-generator control amount calculating device 7 sets that motor-generator torque (i.e., the motor-generator control amount as the driving control amount). As described above, the driver required torque calculating device 1, the required vehicle driving torque calculating device 2, the engine control amount calculating device 3, and the motor-generator control amount calculating device 7 are provided in the main ECU 101. Also, the engine control device 4 is provided in the engine ECU 102, and the motor-generator control device 6 is provided in the motor-generator ECU 103. In this first example embodiment, the sprung mass damping control amount calculating device 5 is provided in the main ECU 101.

As shown in FIG. 4B as well, the driver required torque calculating device 1 obtains the driver required torque Twr based on the shift position SHp, the accelerator operation amount θa, and the vehicle speed or the angular velocity ω0 of the driving wheels Wh and Wh. This driver required torque Twr is the wheel torque that is generated at the driving wheels Wh and Wh to obtain the driving force required by the driver, and is vehicle driving torque that corresponds to the driving force required by the driver. This driver required torque Twr is transmitted to the required vehicle driving torque calculating device 2, the engine control amount calculating device 3, and the sprung mass damping control amount calculating device 5.

The required vehicle driving torque calculating device 2 includes an adder 2a that receives driver required torque Twr and the sprung mass damping control amount (i.e., sprung mass damping control torque Twc which will be described later) that is set by the sprung mass damping control amount calculating device 5. This adder 2a adds the sprung mass damping control torque Twc to the driver required torque Twr. The added value is the required vehicle driving torque Td for the driving wheels Wh and Wh to achieve both the driving force required by the driver and sprung mass damping control. If the sprung mass damping control torque Twc is a positive value, the required vehicle driving torque Td is greater than the driver required torque Twr. If on the other hand the sprung mass damping control torque Twc is a negative value, the required vehicle driving torque Td is less than the driver required torque Twr.

Also, the required vehicle driving torque calculating device 2 has a braking torque calculating portion 2b that sets the braking torque Tb described above, and a subtracter 2c that subtracts this braking torque Tb from the required vehicle driving torque Td obtained by the adder 2a. Therefore, when braking force is generated, the subtracted value in the subtracter 2c is set as the required vehicle driving torque Td (i.e., Td←Td−Tb). Incidentally, when braking force is not generated, the braking torque Tb is 0 so even after the subtracter 2c, the sum obtained in the adder 2a is the required vehicle driving torque Td.

Also, the required vehicle driving torque calculating device 2 is provided with a HV basic performance maintaining portion 2d that obtains the HV basic performance maintaining value described above. For example, in this case, it is assumed that a correction value which is added to the required vehicle driving torque Td that has been through the subtracter 2c is obtained as the HV basic performance maintaining value. The HV basic performance maintaining value Thv is obtained as a positive or negative value according to the current vehicle state and the HV basic performance. The required vehicle driving torque calculating device 2 is provided with an adder 2e which adds the required vehicle driving torque Td that has been through the subtracter 2c to the HV basic performance maintaining value Thv. Therefore, the added value of the adder 2e becomes the required vehicle driving torque Td for the driving wheels Wh and Wh (i.e., Td←Td+Thv). Then the required vehicle driving torque calculating device 2 sets the required vehicle driving torque Td that has been through the adder 2e as the final required vehicle driving torque Tdr. This final required vehicle driving torque Tdr is the vehicle driving torque at the driving wheels Wh and Wh that is able to satisfy all of i) the driving force required by the driver, ii) sprung mass damping control, and iii) HV basic performance. In this first example embodiment, this final required vehicle driving torque. Tdr is output to the motor-generator control amount calculating device 7.

As described above, the driver required torque Twr is also input to the engine control amount calculating device 3. In this first example embodiment, the engine control amount (i.e., the required engine torque Ter and the required engine speed Ner) corresponding to the driver required torque Twr is set by the engine control amount calculating device 3, and the driving force corresponding to the driving force required by the driver is generated by the output of the engine 10.

The engine control amount calculating device 3 also receives information related to the vehicle speed V or the angular velocity ω0 of the driving wheels Wh and Wh, and information related to the SOC of the battery 41. The engine control amount calculating device 3 multiplies the angular velocity ω0 of the driving wheels Wh and Wh by the driver required torque Twr with a multiplier 3a. The multiplied value is the required vehicle power at the driving wheels Wh and Wh. This engine control amount calculating device 3 converts that multiplied value into engine power Pe in an engine power converting portion 3b. The engine power converting portion 3b takes the gear ratio of the power transmission apparatus such as the power transmission device 50 and the power split mechanism 20 into account at the time of this conversion. This engine control amount calculating device 3 obtains the required engine power Per for the engine 10 by adding the correction power Pbat that corresponds to the information related to the SOC of the battery 41 to the engine power Pe in the adder 3c. Then the engine control amount calculating device 3 checks the required engine power Per on the engine control map in FIG. 2 described above, and obtains the engine control amount (i.e., the required engine torque Ter and the required engine speed Ner). The required engine torque Ter and the required engine speed Ner are then output to the engine control device 4. Also, the required engine torque Ter is converted into required vehicle driving torque Tder from the engine output at the driving wheels Wh and Wh with a driving torque converting portion 3d. This driving torque converting portion 3d takes the gear ratio of the power transmission apparatus into account at the time of this conversion. The required vehicle driving torque Tder from the engine output is output to the motor-generator control amount calculating device 7.

The engine control device 4 controls the throttle opening amount and the like to achieve the received engine control amount (i.e., the required engine torque Ter and the required engine speed Ner) so that driving force corresponding to the driving force required by the driver is generated in the vehicle.

The sprung mass damping control in the first example embodiment is executed by obtaining the sprung mass damping control amount for suppressing sprung mass vibration generated in the vehicle body, and generating this sprung mass damping control amount in the vehicle body using the motor-generator torque Tmg2 of the second motor-generator 32, as described above. This sprung mass damping control amount may be obtained using a well-known method in this technical field, and is calculated by the sprung mass damping control amount calculating device 5. For example, a motion model of the sprung mass vibration (i.e., bounce vibration and pitch vibration) of the vehicle is created, and the sprung mass damping control amount calculating device 5 calculates the state variables of the sprung mass vibration with this motion model. These state variables of the sprung mass vibration are i) the displacements z and θ of the vehicle body when the driver required torque Twr at the driving wheels Wh and Wh corresponding to the driving force required by the driver (i.e., the required wheel torque of the driving wheels Wh and Wh corresponding to the driving force required by the driver) and the current wheel torque at the driving wheels Wh and Wh (more specifically, the estimated value of that wheel torque) are input to the motion model, and the rate of changes dz/dt and dθ/dt of those displacements. This sprung mass damping control amount calculating device 5 obtains the wheel torque of the driving wheels Wh and Wh that brings the state variables of the sprung mass vibration to 0 or the minimum value, and then sets this as the sprung mass damping control torque Twc (i.e., the sprung mass damping control amount).

More specifically, the sprung mass damping control amount calculating device 5 is provided with a feed-forward control portion 5a and a feedback control portion 5b.

The feed-forward control portion 5a has the structure of a so-called optimum regulator, and includes a motion model portion $5a_1$ and a driver required torque correcting portion $5a_2$. In this feed-forward control portion 5a, the driver required torque Twr is input to the motion model portion $5a_1$ of the sprung mass vibration of the vehicle body. This motion model portion $5a_1$ is used to calculate the response of the state variables of the vehicle body with respect to the input driver required torque Twr. Also, the driver required torque correcting portion $5a_2$ is used to calculate a correction amount of the driver required torque Twr to minimize those state variables.

The feedback control portion 5b also has the structure of an optimum regulator. In this feedback control portion 5b, the wheel torque estimated value Tw at the driving wheels Wh and Wh is calculated by a wheel torque estimator $5b_1$, as will be described later. Then FB gain (i.e., gain for adjusting the balance of the contribution of the wheel torque estimated value Tw and the driver required torque Twr, in the motion model portion $5a_1$) is multiplied by that wheel torque estimated value Tw.

The wheel torque estimated value Tw that has been multiplied by the FB gain is then added to the driver required torque Twr in the feed-forward control portion 5a and to the motion model portion $5a_1$ as disturbance input. As a result, the correction amount of the driver required torque Twr for the disturbance is also calculated in this feed-forward control portion 5a.

In this way, in this sprung mass damping control, an equation-of-state of the state variables of the bounce direction and the pitch direction into which the driver required torque Twr and the wheel torque estimated value Tw (i.e., the disturbance) has been input is formed assuming a dynamic motion model of the sprung mass vibration (i.e., bounce vibration and pitch vibration) of the vehicle body. Then in this sprung mass damping control, an input (torque value) that brings the state variables of the bounce direction and the pitch direction to 0 using the theory of the optimum regulator is determined from that equation-of-state, and that torque value is made the sprung mass damping control amount (i.e., sprung mass damping control torque Twc).

An example of this dynamic motion model is a model in which the vehicle body is regarded as mass M and a rigid body S of the inertia moment I, and this rigid body S is supported by front-wheel suspension with a modulus of elasticity kf and an attenuation rate cf, and rear-wheel suspension with a modulus of elasticity kr and an attenuation rate cr (a sprung mass vibration model for the vehicle body). The equation of motion in the bounce direction and the equation of motion in the pitch direction at the vehicle center of gravity Cg in this case may be as illustrated in Expressions 1 and 2 below, respectively.

[Expression 1]

$$M\frac{d^2z}{dt^2} = -kf(z + Lf \times \theta) - cf\left(\frac{dz}{dt} + Lf \times \frac{d\theta}{dt}\right) - kr(z - Lr \times \theta) - cr\left(\frac{dz}{dt} - Lr \times \frac{d\theta}{dt}\right) \quad (1)$$

[Expression 2]

$$I\frac{d^2\theta}{dt^2} = -Lf\left\{kf(z + Lf \times \theta) + cf\left(\frac{dz}{dt} + Lf \times \frac{d\theta}{dt}\right)\right\} + Lr\left\{kr(z - Lr \times \theta) + cr\left(\frac{dz}{dt} - Lr \times \frac{d\theta}{dt}\right)\right\} + \frac{h}{r} \times T. \quad (2)$$

In Expressions 1 and 2, Lf and Lr represent the distance from the vehicle center of gravity Cg to the front axle and the rear axle, respectively, and r represents the wheel radius. Also, h represents the distance from the road surface to the vehicle center of gravity Cg. Incidentally, in Expression 1, the first and second terms are components of force from the front axle, and the third and fourth terms are components of the force from the rear axle. Further, in Expression 2, the first term is the moment component of the force from the front axle, and the second term is the moment component of the force from the rear axle. Also, the third term in Expression 2 is the moment component of the force applied by the wheel torque T (=Twr+Tw) generated at the driving wheels Wh and Wh about the vehicle center of gravity Cg.

Expressions 1 and 2 can be rewritten in the form of an equation-of-state (of a linear system) as shown in Expression 3 below, with the displacements of the vehicle body z and θ and the rate of changes dz/dt and dθ/dt of those displacements as the state variable vector X(t).

[Expression 3]

$$dX(t)/dt = A \times X(t) + B \times u(t) \quad (3)$$

In Expression 3, X(t), A, and B are as illustrated below.

[Expression 4]

$$X(t) = \begin{pmatrix} z \\ \frac{dz}{dt} \\ \theta \\ \frac{d\theta}{dt} \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

The elements a1 to a4 and b1 to b4 in matrix A are provided by Expressions 1 and 2, respectively, by combining the coefficients of z, θ, dz/dt, and dθ/dt, such that $a1 = -(kf + kr)/M$, $a2 = -(cf + cr)/M$, $a3 = -(kf \times Lf - kr \times Lr)/M$, $$a4 = -(cf \times Lf - cr \times Lr)/M,$$

$$b1 = -(Lf \times kf - Lr \times kr)/I,$$

$$b2 = -(Lf \times cf - Lr \times cr)/I,$$

$$b3 = -(Lf^2 \times kf + Lr^2 \times kr)/I,$$

$$b4 = -(Lf^2 \times cf + Lr^2 \times cr)/I.$$

Also, u(t) in Expression 3 above is shown in Expression 5 below, and is the input of the linear system shown by Expression 3.

[Expression 5]

$$u(t) = T \quad (5)$$

Therefore, from Expression 2 above, element p1 in matrix B can be expressed by Expression 6 below.

[Expression 6]

$$p1 = h/(I \times r) \quad (6)$$

If u(t) in Expression 3 (an equation-of-state) above is as shown in Expression 7 below, then Expression 3 can be written as shown in Expression 8 below.

[Expression 7]

$$u(t) = -K \times X(t) \quad (7)$$

[Expression 8]

$$dX(t)/dt = (A - B \times K) \times X(t) \quad (8)$$

Therefore, when the initial value $X_0(t)$ of X(t) is set to $X_0(t) = (0, 0, 0, 0)$ (assuming that there is no vibration before torque is input) and the differential equation (Expression 8) of the state variable vector X(t) is solved, the torque value u(t) that suppresses sprung mass vibration is determined by determining the gain K that brings X(t), i.e., the displacement in the bounce direction and the pitch direction and the amount of that time rate of change, to 0.

The gain K can be determined using the theory of the so-called optimum regulator. According to this theory, when the value of an evaluation function J (with an integration range of 0 to infinity) in quadratic form in Expression 9 is minimized, X(t) stably converges in the equation-of-state (Expression 3) and the matrix K that minimizes the evaluation function J is applied, as shown in Expression 10 below, which is known.

[Expression 9]

$$J = \int (X^T \times Q \times X + u^T \times R \times u) dt \quad (9)$$

[Expression 10]

$$K = R^{-1} \times B^T \times P \quad (10)$$

Here, P is the solution to a Riccardi equation (Expression 11). This Riccardi equation can be solved by any known method in the field of the linear system. From this, the gain K can be determined.

[Expression 11]

$$-dP/dt = A^T \times P + P \times A + Q - P \times B \times R^{-1} \times B^T \times P \quad (11)$$

Incidentally, Q and R in the evaluation function J and the Riccardi equation are a positive semidefinite symmetric matrix and a positive definite symmetric matrix, respectively, which are set arbitrarily and are weighting matrices of the evaluation function J determined by the designer of the system. For example, with Q and R in the motion model here, when the norm (magnitude) of specified components (such as dz/dt and dθ/dt) from among the components of the state variable vector X(t) is set larger than the norm of other components (such as z and θ), the components in which the norm is set higher converges more stably than the other components do. Also, when the value of the component of Q is increased, the transient characteristic value, i.e., the value of the state variable vector X(t), quickly converges on a stable value, and when the value of R is increased, the consumption energy decreases.

[Expression 12]

$$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$

In actual sprung mass damping control of the sprung mass damping control system according to this first example embodiment, as shown in FIG. 4A, the state variable vector X(t) is calculated by solving the differential equation in Expression 3 using the torque input value by the motion model portion $5a_1$. In the system expressed by Expressions 1 and 2, the state variable vector X(t) which is the output of the motion model portion $5a_1$ is multiplied by the gain K that is determined in order to minimize the state variable vector X(t) or bring it to 0, as described above, by the driver required torque correcting portion $5a_2$. This multiplied value U(t) is a positive or negative value depending on the vibration direction of the sprung mass vibration. This multiplied value U(t) is then converted into wheel torque units of the driving wheels Wh and Wh by the driving torque converting portion 5c. In this first example embodiment, that converted value becomes the reference sprung mass damping control torque Twc0 which is a reference value of the sprung mass damping control amount (hereinafter, referred to as the "reference sprung mass damping control amount"). In the first example embodiment, phase compensation according to the modulation method of the motor-generator control, which will be described later, is performed as necessary on this reference sprung mass damping control torque Twc0 (i.e., the reference sprung mass damping control amount), and the value obtained from this is set as the final sprung mass damping control amount (i.e., sprung mass damping control torque Twc). This final sprung mass damping control amount (i.e., the sprung mass damping control torque. Twc) is output to the adder 2a of the required vehicle drive torque calculating device 2 where it is added to the driver required torque Twr. This system is a resonance system, and the value of the state variable vector X(t) with respect to a given input is essentially only the component of the natural frequency of the system. Therefore, by adding or subtracting the converted value of U(t) or the phase compensation value thereof (=sprung mass damping control torque Twc) to or from the driver required torque Twr, the component of the natural frequency of the system within the driver required torque Twr, i.e., the component that causes sprung mass vibration of the vehicle body, can be corrected, thereby suppressing that sprung mass vibration. When the component of the natural frequency of the system in the required torque applied by the driver is eliminated, the component of the natural frequency of the system in the required vehicle driving torque Tdmg2r from the output of the second motor-generator 32 is only −U(t) or −U(t) with the phase compensation amount removed, so the vibration from wheel torque estimated value Tw (i.e., the disturbance) converges. In FIG. 4A, U(t) is looped to the input side of the motion model portion $5a_1$, but this loop may be eliminated to reduce the calculation amount as long as the desired sprung mass damping control performance can be obtained. Also, in FIG. 4A, FF/FB weighted and adjusted gain is applied by a FF/FB weighted and adjusted gain controlling portion $5b_2$ only in the feedback control. However, this FF/FB weighted and adjusted gain may also be applied in the feed-forward control.

The required vehicle driving torque Tdmg2r from the output of the second motor-generator 32 is the vehicle driving torque applied to the driving wheels Wh and Wh as a result of the second motor-generator 32 outputting the required motor-generator torque Tmg2r, and is calculated in an adder 7a of the motor-generator control amount calculating device 7. This required vehicle driving torque Tdmg2r is obtained by subtracting the required vehicle driving torque Tder from the engine output in the engine control amount calculating device 3, from the final required vehicle driving torque Tdr obtained by the required vehicle driving torque calculating device 2 described above. This required vehicle driving torque Tdmg2r is then converted to the required motor-generator torque Tmg2r for the second motor-generator 32 in the motor-generator torque converting portion 7b. The motor-generator torque converting portion 7b takes the gear ratio of the power transmission apparatus such as the power split device 20 and the power transmission device 50 into account at the time of this conversion. The required motor-generator torque Tmg2r is output to the motor-generator control device 6. This motor-generator control device 6 then controls the inverter 42 to control the second motor-generator 32 to output that required motor-generator torque Tmg2r.

In this first example embodiment, as described above, of the final required vehicle driving torque Tdr, the vehicle driving torque corresponding to the driving force required by the driver is generated by output from the engine 10 (i.e., the required engine torque Ter) and the rest is generated by the output of the second motor-generator 32 (i.e., the required motor-generator torque Tmg2r). The sprung mass damping control torque Twc (i.e., the sprung mass damping control amount) is incorporated into the required vehicle driving torque Tdmg2r from the output of the second motor-generator 32 so sprung mass vibration can be suppressed by having the second motor-generator 32 generate the required motor-generator torque Tmg2r which is the converted value of that required vehicle driving torque Tdmg2r.

Here, the wheel torque estimated value Tw estimated by the wheel torque estimator $5b_1$ from another detectable value of the traveling hybrid vehicle is used for the wheel torque that is input as disturbance in the feedback controlling portion 5b in FIG. 4A. Alternatively, however, a torque sensor may also be provided for each wheel and the wheel torque that is input as that disturbance may be actually detected, for example.

This wheel torque estimated value Tw can be estimated or calculated from Expression 13 below using temporal differentiation of the angular velocity to or the wheel speed Vw (=r×ω) obtained from the wheel speed obtaining device (i.e., the wheel speed sensors 62 and 62) of the driving wheels Wh and Wh, for example. In Expression 13, M is the mass of the hybrid vehicle, and r is the wheel radius.

[Expression 13]

$$Tw = M \times r^2 \times d\omega/dt \quad (13)$$

Here, when the sum of the driving force generated at the location where the driving wheels Wh and Wh contact the road surface is equal to the driving force M×G (G: vehicle longitudinal acceleration) of the entire vehicle, the wheel torque estimated value Tw is provided by Expression 14 below.

[Expression 14]

$$Tw = M \times G \times r \quad (14)$$

Also, the vehicle longitudinal acceleration G of the hybrid vehicle is provided by Expression 15 below by the differential value of the wheel speed r×ω.

[Expression 15]

$$G = r \times d\omega/dt \quad (15)$$

Therefore, the wheel torque estimated value Tw is estimated as shown in Expression 13 above.

Figure 5:
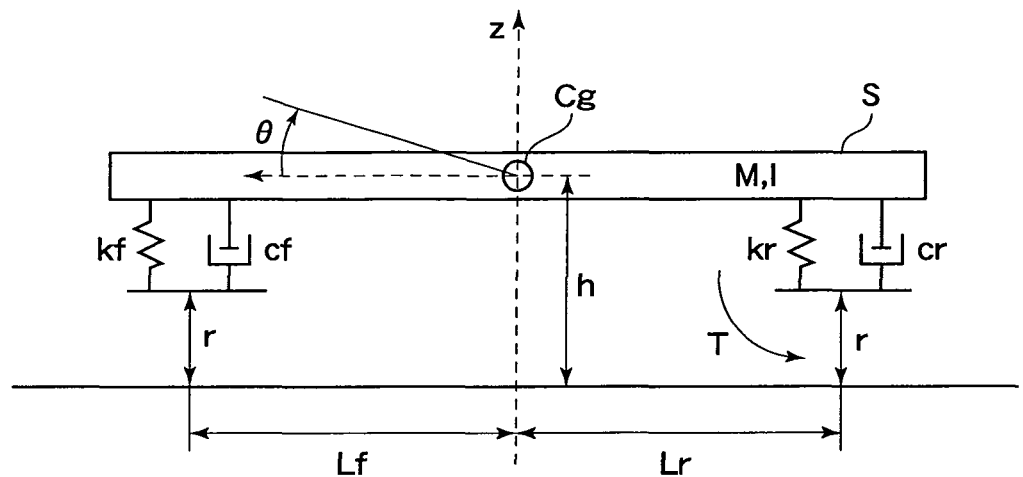
FIG. 5 is a diagram of an example of a dynamic motion model of assumed sprung mass vibration in the sprung mass damping control system and the vehicle according to the invention.
Figure 6:
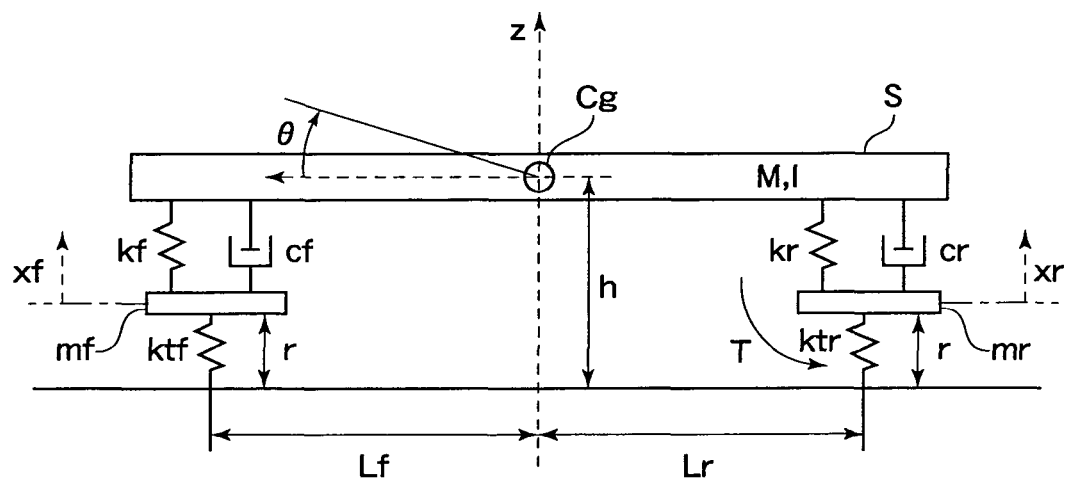
FIG. 6 is a diagram illustrating another example of a dynamic motion model of assumed sprung mass vibration in the sprung mass damping control system and the vehicle according to the invention.

Also, the dynamic motion model of the bounce direction and the pitch direction of the vehicle body in the example described above may be a model (vehicle body sprung mass/unsprung mass vibration model) that takes into account the spring elasticity of the front and rear wheel tires, in addition to the structure shown in FIG. 5, as shown in FIG. 6, for example. When the front wheel tires have a modulus of elasticity of ktf and the rear wheel tires have a modulus of elasticity of ktr, the equation of motion of the bounce direction of the vehicle center of gravity Cg and the equation of motion of the pitch direction of the vehicle center of gravity Cg can written as shown in Expressions 16a to 16d below, as is also evident from FIG. 6.

[Expression 16]

$$M\frac{d^2 z}{dt^2} = -kf(z + Lf \times \theta - xf) - cf\left(\frac{dz}{dt} + Lf \times \frac{d\theta}{dt} - \frac{dxf}{dt}\right) - \\ kf(z - Lf \times \theta - xr) - cr\left(\frac{dz}{dt} - Lr \times \frac{d\theta}{dt} - \frac{dxr}{dt}\right) \quad (16a)$$

$$I\frac{d^2\theta}{dt^2} = -Lf\left\{kf(z + Lf \times \theta - xf) + cf\left(\frac{dz}{dt} + Lf \times \frac{d\theta}{dt} - \frac{dxf}{dt}\right)\right\} + \\ Lr\left\{kr(z - Lr \times \theta - xr) + cr\left(\frac{dz}{dt} - Lr \times \frac{d\theta}{dt} - \frac{dxr}{dt}\right)\right\} + \frac{h}{r} \times T \quad (16b)$$

$$mf\frac{d^2 xf}{dt^2} = \\ kf(z + Lf \times \theta - xf) + cf\left(\frac{dz}{dt} + Lf \times \frac{d\theta}{dt} - \frac{dxf}{dt}\right) + ktf \times xf \quad (16c)$$

$$mr\frac{d^2 xr}{dt^2} = kr(z + Lr \times \theta - xr) + cr\left(\frac{dz}{dt} - Lr \times \frac{d\theta}{dt} - \frac{dxr}{dt}\right) + ktr \times xr \quad (16d)$$

In these expressions, xf and xr are unsprung mass displacement amounts of the front and rear wheels, respectively, and mf and mr is the unsprung mass of the front and rear wheels, respectively. Expressions 16a to 16d form equations of state as shown in Expression 3 above, just like FIG. 5, with z, θ, xf, xr, and the time differential value thereof as the state variable vectors (where matrix A is eight rows and eight columns and matrix B is eight rows and one column). The gain matrix K that brings the state variable vectors to 0 can be determined according to the theory of the optimum regulator. The actual sprung mass damping control in this case is just as it is in FIG. 5.

Also, in addition to the vibration component that is input from the road surface via the wheels, the vibration component generated in the drive source such as the engine 10 and the vibration component generated in the power transmission apparatus such as the power split device 20 and the power transmission device 50 in the transmission path of the power from that power source can be considered as the vibration component to be suppressed in the hybrid vehicle. When suppressing the vibration of the vehicle body caused by these various vibration components, the torque adjusting amount (i.e., the sprung mass damping control amount) necessary to suppress the vibration components may obtained for each vibration component to be suppressed, and these torque adjusting amounts may be output as described above from the second motor-generator 32.

Incidentally, in a vehicle provided with this motor-generator as the drive source, the direct current (DC) voltage from the battery 41 is increased (i.e., stepped up) by a step up converter, not shown, and that stepped up DC voltage is converted into alternate current (AC) voltage that is used to drive the motor-generator (the second motor-generator 32 in this example). At this time, the current command to the motor-generator which is driven by a predetermined waveform signal changes the control method of the inverter 42 (i.e., the waveform signal modulation method) according to the vehicle speed and the amount of the command torque (the required vehicle driving torque Tdmg2r in this example). Here, this modulation method switches between a sine wave pulse width modulation (PWM) control method, a square wave control method, and an overmodulation PWM control method. For example, the square wave control method has less switching loss and better system efficiency than the sine wave PWM control method and the overmodulation PWM, and is therefore selected when these qualities are required. Also, the overmodulation PWM is selected in the medium speed range and is used to improve output. The motor-generator control device 6 of the motor-generator ECU 103 selects the modulation method.

In a vehicle that switches modulation methods according to the command torque and vehicle speed ranges, the output responsiveness of the sprung mass damping control amount differs depending on those ranges, i.e., depending on the modulation method. Therefore, the desired sprung mass damping control may be able to be performed in one range but may become difficult to perform in another range, which may reduce the damping effect of the sprung mass damping control. For example, when the overmodulation PWM control method is used, the waveform of the demodulated signal becomes distorted compared with when another control method such as the sine wave PWM control method is used. This creates variation in the output responsiveness of the sprung mass damping control amount, and as a result, the desired sprung mass damping control may no longer be able to be executed properly.

Therefore, in the sprung mass damping control system of this first example embodiment, phase compensation is performed on the sprung mass damping control signal corresponding to the sprung mass damping control amount according to the state (in this case, the waveform signal described above), so variation in the output responsiveness of the sprung mass damping control amount throughout the entire command torque and vehicle speed ranges is reduced or eliminated. More specifically, phase compensation is performed on the sprung mass damping control signal corresponding to the sprung mass damping control amount according to that waveform signal (in other words, according to the waveform modulation method), so variation in the output responsiveness of the sprung mass damping control amount throughout the entire command torque and vehicle speed ranges (in other words, between modulation methods) is reduced or eliminated.

This sprung mass damping control system is provided with a sprung mass damping control amount adjusting apparatus that compensates for variation in output responsiveness by performing phase compensation on the sprung mass damping control signal according to the sprung mass damping control amount according to that modulation method. This sprung mass damping control amount adjusting apparatus may be provided as one function of the spring vibration control amount calculating device 5 or between the spring vibration control amount calculating device 5 and the adder 2a. In the description below, an example is given in which the sprung mass damping control amount adjusting apparatus is provided as a function of the spring vibration control amount calculating device 5.

The spring vibration control amount calculating device 5 in this first example embodiment is provided with a sprung mass damping control amount responsiveness compensating portion 5d as the sprung mass damping control amount adjusting apparatus. Here, the sprung mass damping control amount responsiveness compensating portion 5d is arranged after the driving torque converting portion 5c, and adjusts the phase according to the modulation method of the motor-generator control of the reference sprung mass damping control torque Twc0 (i.e., the reference sprung mass damping control amount) obtained by that driving torque converting portion 5c.

Figure 7:
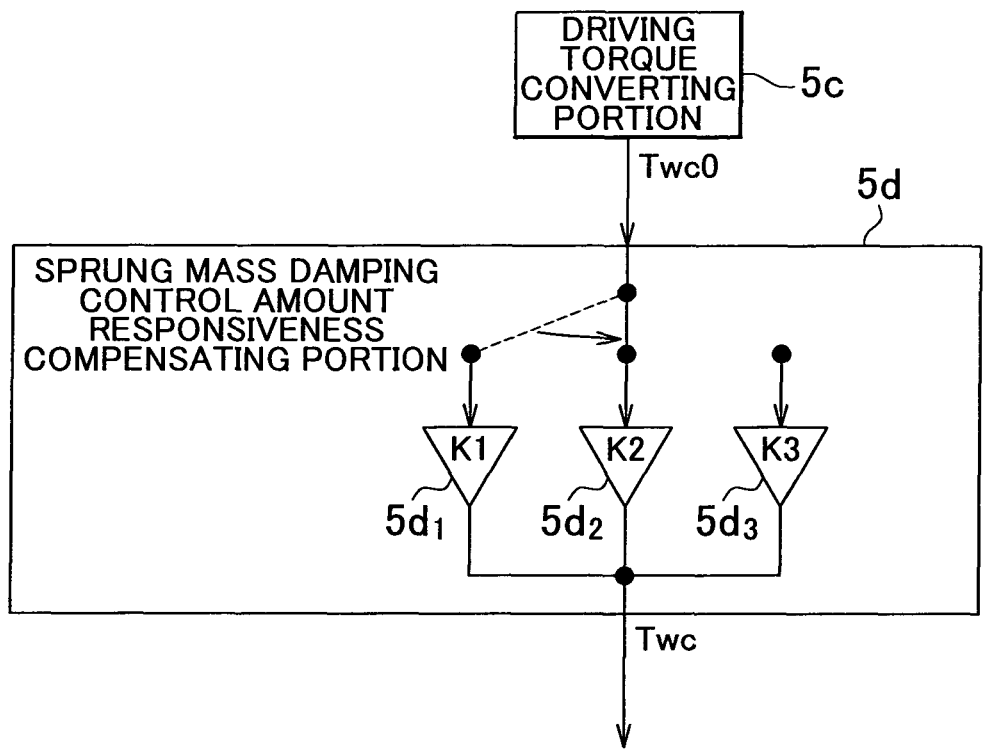
FIG. 7 is a view in the form of control blocks showing a frame format of a specific example of a sprung mass damping control amount responsiveness compensating portion according to a first example embodiment of the invention.

This phase compensating control of this sprung mass damping control amount may be applied not only to a vehicle that employs all of the modulation methods described above, but also to a vehicle that employs at least two of a plurality of modulation methods including others not described here. In the example described below, three modulation methods will be employed, and will be referred to simply as the first, second, and third modulation methods for the sake of convenience. Therefore, the sprung mass damping control amount responsiveness compensating portion 5d in this example includes a first sprung mass damping control amount adjusting portion $5d_1$ for the first modulation method, a second sprung mass damping control amount adjusting portion $5d_2$ for the second modulation method, and a third sprung mass damping control amount adjusting portion $5d_3$ for the third modulation method, as shown in FIG. 7.

The structure of these first to third sprung mass damping control amount adjusting portions $5d_1$ to $5d_3$ is not limited as long as it allows them to perform phase compensation according to the modulation method. For example, the first sprung mass damping control amount adjusting portions $5d_1$ is structured to adjust to the reference sprung mass damping control torque Twc0 (i.e., the reference sprung mass damping control amount) using a first sprung mass damping control amount adjusting gain K1(s) that corresponds to the first modulation method, the second sprung mass damping control amount adjusting portions $5d_2$ is structured to adjust to the reference sprung mass damping control torque Twc0 (i.e., the reference sprung mass damping control amount) using a second sprung mass damping control amount adjusting gain K2(s) that corresponds to the second modulation method, and the third sprung mass damping control amount adjusting portions $5d_3$ is structured to adjust to the reference sprung mass damping control torque Twc0 (i.e., the reference sprung mass damping control amount) using a third sprung mass damping control amount adjusting gain K3(s) that corresponds to the third modulation method. Here, phase compensation is performed by multiplying one of the first to third sprung mass damping control amount adjusting gains K1(s) to K3(s) corresponding to the modulation methods by the reference sprung mass damping control torque Twc0, and setting the thus obtained sprung mass damping control torque Twc as the final sprung mass damping control amount.

More specifically, the phase compensating control of the sprung mass damping control amount may be phase advancing control if the modulation method ends up advancing the phase, and may be phase retarding control if the modulation method ends up retarding the phase. Here, the phase lag amount and the phase advance amount can be ascertained for each modulation method beforehand. Therefore, each of the first to third sprung mass damping control amount adjusting gains K1(s) to K3(s) can be set for the corresponding modulation method, as a phase advancing control gain or phase lag control gain in advance according to that phase lag amount or phase advance amount. The first to third sprung mass damping control amount adjusting gain K1(s) to K3(s) for phase advancing control advances the phase of a control signal according to the reference sprung mass damping control torque Twc0 (i.e., the reference sprung mass damping control amount) by a phase advance amount that corresponds to the phase lag amount. On the other hand, the first to third sprung mass damping control amount adjusting gain K1(s) to K3(s) for phase lag control retards the phase of a control signal that accompanies the reference sprung mass damping control torque Twc0 (i.e., the reference sprung mass damping control amount) by a phase lag amount that corresponds to the phase advance amount.

Here an example will be given of phase advancing control. More specifically, the sprung mass damping control amount adjusting gain K1(s) for phase advancing control becomes $1+\tau1\times s$ using a Laplace operator and a time constant $\tau1$, while the sprung mass damping control amount adjusting gain K2(s) for phase advancing control becomes $1+\tau2\times s$ using a Laplace operator and a time constant $\tau2$, and the sprung mass damping control amount adjusting gain K3(s) for phase advancing control becomes $1+\tau3\times s$ using a Laplace operator and a time constant $\tau3$. For example, assuming that the phase lag amount increases in order from the first modulation method to the third modulation method (i.e., phase lag amount of second modulation method is larger than that of the first modulation method, and the phase lag amount of the third modulation method is larger than that of the second modulation method), then the sprung mass damping control amount adjusting gains K1(s), K2(s), and K3(s) are made larger in the same order. At this time, one of the modulation methods is made a reference, and the first to the third sprung mass damping control amount adjusting gain K1(s) to K3(s) may be determined according to the degree to which the another modulation method delays or advances the phase with respect to this reference modulation method. For example, when the first modulation method is used as the reference modulation method, the first sprung mass damping control amount adjusting gain K1(s) is set to 1 and the second and third sprung mass damping control amount adjusting gains K2(s) and K3(s) are set to values greater than 1.

The sprung mass damping control amount responsiveness compensating portion 5d selects one of the sprung mass damping control amount adjusting portions from among the first to the third sprung mass damping control amount adjusting portions $5d_1$ to $5d_3$ based on the information pertaining to the modulation method received from the motor-generator control device 6. Actually, one of the first sprung mass damping control amount adjusting portion $5d_1$, the second sprung mass damping control amount adjusting portion $5d_2$, or the third sprung mass damping control amount adjusting portion $5d_3$ has already been selected so when it is determined that the modulation method is to be switched based on the received information, the sprung mass damping control amount adjusting portion is switched to the sprung mass damping control amount adjusting portion that corresponds to the new modulation method. Accordingly, the control signal according to the reference sprung mass damping control torque Twc0 (i.e., the reference sprung mass damping control amount) advances the phase by an amount that matches the modulation method in the spring vibration control amount calculating device 5. Then, the control signal according to the phase-advanced reference sprung mass damping control torque Twc0 (i.e., the reference sprung mass damping control amount) becomes a sprung mass damping control signal according to the final sprung mass damping control torque Twc (i.e., sprung mass damping control amount). Switches to the other modulation methods are performed in the same manner.

Sprung mass damping control is executed based on the sprung mass damping control torque Twc (i.e., the sprung mass damping control amount) set in this way. When executing sprung mass, damping control, the second motor-generator 32 is controlled by the modulation method after the switch, so there is a lag in the sprung mass damping control signal according to the sprung mass damping control torque Twc. However, the phase is advanced by the amount of this lag in advance, so variation in the output responsiveness of the sprung mass damping control amount before and after the modulation method is switched is dealt with (eliminated or reduced) in the sprung mass damping control. Therefore, according to the sprung mass damping control system of this first example embodiment, even if the modulation method is switched, it is possible to reduce or eliminate variation in the output responsiveness of the sprung mass damping control amount throughout the entire command torque and vehicle speed ranges (i.e., between modulation methods). Accordingly, the sprung mass damping control system of this first example embodiment is able to compensate for the variation in the output responsiveness of the sprung mass damping control amount of each modulation method regardless of the type of modulation method. Thus, the desired sprung mass damping control can be executed over the entire ranges.

Moreover, a high-pass filter (HPF) can advance the phase and bring the phase lag to 0 at or above the cutoff frequency. Therefore, a high-pass filter can be used as the first to the third sprung mass damping control amount adjusting portions $5d_1$ to $5d_3$ when the modulation method causes a lag in the phase. Also, an all-pass filter (APF) capable of changing the phase characteristics according to the phase lag amount or the phase advance amount while leaving the amplitude characteristics as they are may be used as the first to the third sprung mass damping control amount adjusting portions $5d_1$ to $5d_3$. Moreover, the first to the third sprung mass damping control amount adjusting portions $5d_1$ to $5d_3$ may also perform so-called dead time control in which they perceive the phase lag amount as dead time that accompanies a response lag.

Here, the first to the third sprung mass damping control amount adjusting portions $5d_1$ to $5d_3$, i.e., the first to the third sprung mass damping control amount adjusting gains K1(s) to K3(s), may be switched right when the modulation method is switched, or a switching method such that described below may be applied. In the description below, it will be assumed that the first modulation method is the current modulation method, from which a switch will be made into the second modulation method.

In sprung mass damping control, feedback control is performed so immediately after the modulation method switches, the reference sprung mass damping control torque Twc0 (i.e., the reference sprung mass damping control amount) is set based on a detected value with the modulation method before the switch. Phase compensation according to the new modulation method is performed on that reference sprung mass damping control torque Twc0. Accordingly, appropriate phase compensation is not performed in sprung mass damping control immediately after the modulation method has been switched, so variation may occur in the output responsiveness of the sprung mass damping control amount. To avoid this, it is desirable to determine the switching method of the sprung mass damping control amount adjusting gain immediately after the modulation method has been switched.

For example, one conceivable method is to gradually reduce the sprung mass damping control amount adjusting gain to 0 from the first sprung mass damping control amount adjusting gain $K1(s)$ according to the first modulation method, and then after it reaches 0, switch it to the second sprung mass damping control amount adjusting gain $K2(s)$ according to the second modulation method. This makes it possible to avoid variation in the output responsiveness of the sprung mass damping control amount by switching the sprung mass damping control amount adjusting gain to the new sprung mass damping control amount adjusting gain after a slight pause. The sprung mass damping control amount adjusting gain in this case may first be changed from the first sprung mass damping control amount adjusting gain $K1(s)$ to 0, and then gradually increased to the second sprung mass damping control amount adjusting gain $K2(s)$ from 0.

Also, the difference between the first sprung mass damping control amount adjusting gain $K1(s)$ and the second sprung mass damping control amount adjusting gain $K2(s)$ before and after the switch may be gradually reduced, and then the switch to the new sprung mass damping control amount adjusting gain may be made after a slight pause. For example, when $K1(s)<K2(s)$, the sprung mass damping control amount adjusting gain may be gradually increased from the first amount adjusting gain $K1(s)$ to the second sprung mass damping control amount adjusting gain $K2(s)$.

Further, when switching the modulation method, the switch to the second sprung mass damping control amount adjusting gain $K2(s)$ may be made after a predetermined period of time. At that time, the switch from the first sprung mass damping control amount adjusting gain $K1(s)$ to the second sprung mass damping control amount adjusting gain $K2(s)$ may be done all at once or gradually as described above.

Incidentally, in the example described above, the sprung mass damping control amount adjusting apparatus (i.e., the sprung mass damping control amount responsiveness compensating portion $5d$) is provided between the driving torque converting portion $5c$ and the adder $2a$. Alternatively, however, the sprung mass damping control amount responsiveness compensating portion $5d$ may be arranged upstream of the driving torque converting portion $5c$ and the same phase compensation may be performed on the multiplied value $U(t)$ input to this driving torque converting portion $5c$. Also, the sprung mass damping control amount responsiveness compensating portion $5d$ may correct the gain K of the driver required torque correcting portion $5a_2$ and/or the FF/FB weighted and adjusted gain of the FF/FB weighted and adjusted gain control portion $5b_2$.

Also, by performing the phase compensation as in this example, the stability of feedback control in sprung mass damping control may decrease when the phase is delayed, and drivability may decrease due to an increase in noise in the final sprung mass damping control torque Twc (i.e., the sprung mass damping control amount) when the phase is advanced. Therefore, when that stability may end up exceeding the allowed range or when drivability may decrease, it is desirable to adjust the first to the third sprung mass damping control amount adjusting gains $K1(s)$ to $K3(s)$ to avoid these from happening. Another way to avoid these from happening is to correct the gain K of the driver required torque correcting portion $5a_2$ and/or the FF/FB weighted and adjusted gain of the FF/FB weighted and adjusted gain control portion $5b_2$.

Further, the phase compensation in this example may also be performed under different circumstances, such as when the required vehicle driving torque Tdr is smoothed by the required vehicle drive torque calculating device 2, for example. That is, the smoothing process delays the phase of the control signal related to the required vehicle driving torque Tdr, and as a result, the phase of the control signal related to the sprung mass damping control torque Twc (i.e., the sprung mass damping control amount) is also delayed. Thus, performing the phase advancing control or the like described above enables the desired sprung mass damping control to be executed. In particular, the sprung mass damping control amount responsiveness compensating portion $5d$ shown in FIG. 7 is useful in that, in a situation in which smoothing is executed in a variety of patterns, it can switch the sprung mass damping control amount adjusting gain accordingly.

Next, a second example embodiment of the sprung mass damping control system of a vehicle and a vehicle provided with that sprung mass damping control system according to the invention will be described with reference to FIGS. 8 and 9.

In the sprung mass damping control system according to the first example embodiment described above, if there is a switch between at least two types of modulation methods, regardless of the type of modulation method, phase compensation of the sprung mass damping control signal of the sprung mass damping control amount corresponding to each modulation method is performed, thereby reducing or eliminating variation in the output responsiveness of the sprung mass damping control amount throughout the entire command torque and vehicle speed ranges (i.e., between modulation methods).

However, when that modulation method is the overmodulation PWM control method, as described above, the waveform of the demodulated signal distorts compared with when another control method such as the sine wave PWM control method is used. Therefore, at this time, not only does variation occur in the output responsiveness of the sprung mass damping control amount, but the waveform of the sprung mass damping control signal according to the sprung mass damping control amount that is different from the command is output. Therefore, the likelihood that the desired sprung mass damping control will be unable to be executed properly is higher with this modulation method than other modulation methods.

Therefore, in this second example embodiment, the way in which the modulation method is applied when controlling the motor-generator is different for the overmodulation PWM control method than it is for the other modulation methods. The sprung mass damping control system according to this second example embodiment the sprung mass damping control amount adjusting apparatus in the sprung mass damping control system of the first example embodiment is changed in the manner described below. In the description below, the sprung mass damping control system of the second example embodiment is applied to the hybrid vehicle illustrated in the first example embodiment. Incidentally, the sprung mass damping control amount adjusting apparatus may be arranged in the same position as it is in the first example embodiment. In the following description, the structure is the same as it is in FIG. 7.

For example, the sprung mass damping control amount responsiveness compensating portion 5d prohibits sprung mass damping control when the modulation method is the overmodulation PWM control method. At this time, the sprung mass damping control amount responsiveness compensating portion 5d sets the reference sprung mass damping control torque Twc0 (i.e., the reference sprung mass damping control amount) obtained by the driving torque converting portion 5c to 0 to prevent sprung mass damping control.

Also, the sprung mass damping control amount responsiveness compensating portion 5d is structured to restrict, not prohibit, the sprung mass damping control when the modulation method is the overmodulation PWM control method, to compensate for variation in the output responsiveness of the sprung mass damping control.

For example, the sprung mass damping control amount responsiveness compensating portion 5d in this second example embodiment has one sprung mass damping control amount adjusting gain K(s) and accommodates the different modulation methods by increasing or decreasing this sprung mass damping control amount adjusting gain K(s). Also, the modulation method in this example is switched between the overmodulation PWM control method and one other control method other than the overmodulation PWM control method.

In this case, the distortion of the waveform of the demodulated signal when the modulation method is the overmodulation PWM control method only occurs when at least one of the amplitude or the frequency of the control signal of the reference sprung mass damping control torque Twc0 (i.e., the reference sprung mass damping control amount) is within a predetermined range. More specifically, that distortion of the waveform tends to occur with a larger amplitude and at a higher frequency. Therefore, it is desirable to restrict sprung mass damping control when at least one of the amplitude or the frequency is within a predetermined range. In this case, sprung mass damping control does not need to be restricted when both the amplitude and the frequency are outside of that predetermined range. Accordingly, when the modulation method is the overmodulation PWM control method the sprung mass damping control amount responsiveness compensating portion 5d analyzes the amplitude and the frequency of the control signal of the reference sprung mass damping control torque Twc0 (i.e., the reference sprung mass damping control amount), and reduces the sprung mass damping control amount adjusting gain K(s) when at least one of the obtained amplitude or frequency is within a predetermined range. If both the amplitude and the frequency are outside of that predetermined range, the sprung mass damping control amount responsiveness compensating portion 5d sets the sprung mass damping control amount adjusting gain K(s) as a reference value. Here, the sprung mass damping control amount adjusting gain K(s) of the modulation method other than the overmodulation PWM control method is set as the reference gain. In contrast to this kind of control, control may be executed that restricts sprung mass damping control when the amplitude and the frequency are within a predetermined range, and does not restrict sprung mass damping control only when the amplitude and the frequency are outside of that range. The region shown by hatching in FIG. 9 indicates the predetermined range in this case.

Figure 8:
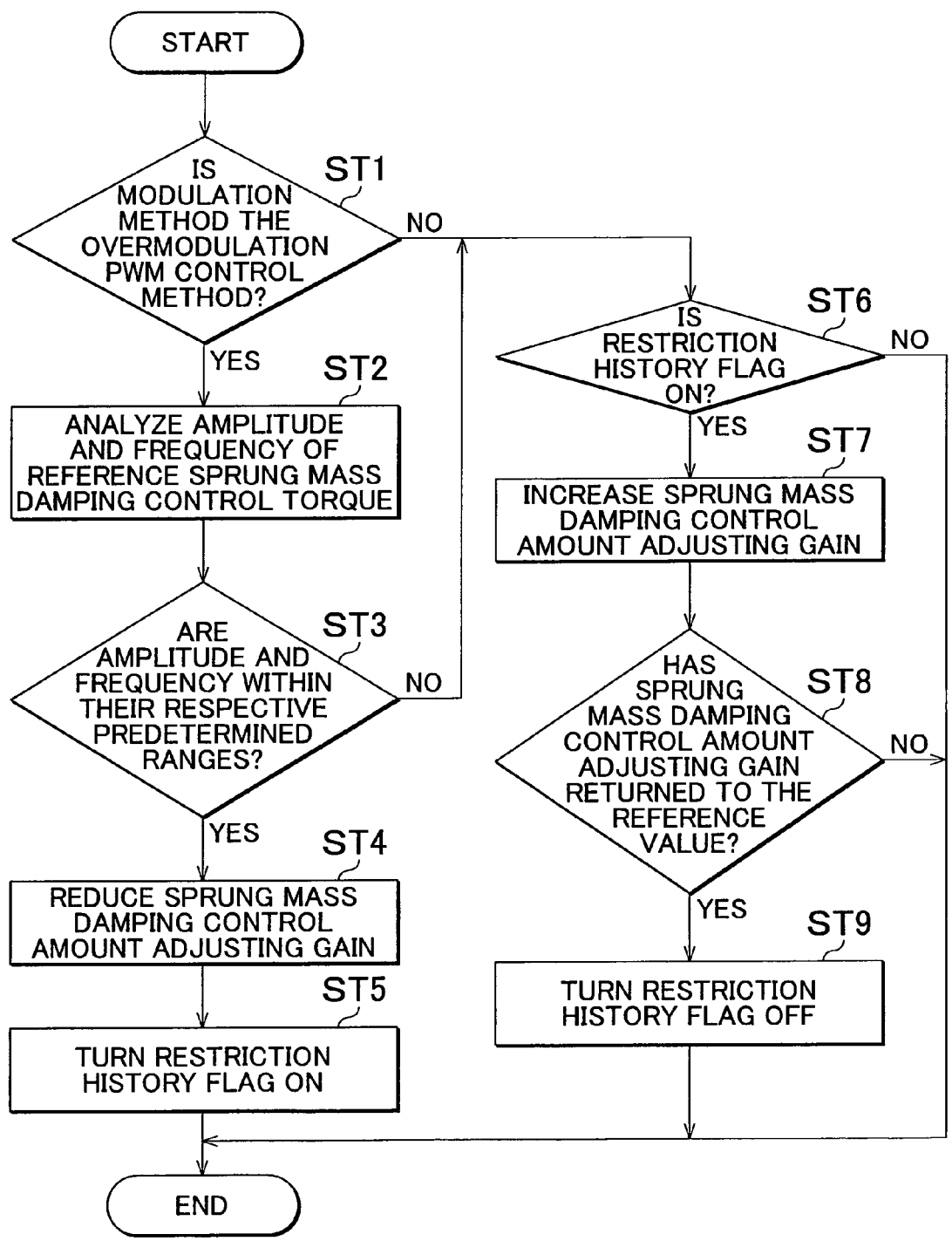
FIG. 8 is a flowchart illustrating an adjustment operation of the sprung mass damping control amount in the sprung mass damping control system and the vehicle according to a second example embodiment of the invention.

More specifically, the sprung mass damping control amount responsiveness compensating portion 5d determines whether the modulation method is the overmodulation PWM control method based on the information related to the modulation method received from the motor-generator control device 6, as illustrated by the flowchart in FIG. 8 (step ST1).

Here, if the modulation method is the overmodulation PWM control method, the sprung mass damping control amount responsiveness compensating portion 5d analyzes the amplitude and the frequency of the control signal of the reference sprung mass damping control torque Twc0 (i.e., the reference sprung mass damping control amount) received from the driving torque converting portion 5c (step ST2).

Then the sprung mass damping control amount responsiveness compensating portion 5d determines whether the analyzed amplitude and frequency are within respective predetermined regions (step ST3). For example, the sprung mass damping control amount responsiveness compensating portion 5d makes this determination by matching the analyzed amplitude and frequency against the map data shown in FIG. 9. The map data in FIG. 9 divides the amplitude and frequency into a respective plurality of ranges. According to this map data, it is determined that the analyzed amplitude and frequency are within their respective predetermined ranges when the analyzed amplitude is in the large amplitude region and the analyzed frequency is in the high frequency region, both of which are indicated by hatching. On the other hand, it is determined that the analyzed amplitude and frequency are not within their respective predetermined ranges when even one of the amplitude or frequency is in a region not indicated by hatching. Incidentally, with this map data, the amplitude increases in the order of A1, A2, A3, . . . , and the frequency becomes higher in the order of f1, f2, f3.

If the analyzed amplitude and frequency are within their respective predetermined ranges, the sprung mass damping control amount responsiveness compensating portion 5d reduces the sprung mass damping control amount adjusting gain K(s) from the reference value (step ST4). The amount of this reduction may be a fixed amount that is set in advance, or may be changed according to the magnitude of the analyzed amplitude and the height of the analyzed frequency. Therefore, the sprung mass damping control amount responsiveness compensating portion 5d obtains the final sprung mass damping control torque Twc by multiplying the reduced sprung mass damping control amount adjusting gain K(s) by the reference sprung mass damping control torque Twc0. Accordingly, at this time, sprung mass damping control that is restricted more than with the other modulation method is executed.

After decreasing the sprung mass damping control amount adjusting gain K(s), the sprung mass damping control amount responsiveness compensating portion 5d raises a restriction history flag that indicates that the sprung mass damping control has been restricted (i.e., turns the restriction history flag on) (step ST5).

If, on the other hand, it is determined in step ST3 that the amplitude and frequency are not within their respective predetermined ranges, or if it is determined in step ST1 that the modulation method is not the overmodulation PWM control method, the sprung mass damping control amount responsiveness compensating portion 5d determines whether the restriction history flag is raised (step ST6). If it is determined in step ST6 that the restriction flag is not raised, this cycle of the routine is ended. For example, if the determination in step ST3 is No and then the determination in step ST6 is also No, the sprung mass damping control amount responsiveness compensating portion 5d ends the routine without changing the sprung mass damping control amount adjusting gain K(s) from the reference value.

If the restriction history flag is raised, the sprung mass damping control amount responsiveness compensating portion 5d gradually increases the sprung mass damping control amount adjusting gain K(s) so that it returns to the reference value (step ST7). Then the sprung mass damping control amount responsiveness compensating portion 5d determines whether the sprung mass damping control amount adjusting gain K(s) has returned to the reference value (step ST8). If the sprung mass damping control amount adjusting gain K(s) has not yet returned to the reference value, the process returns to step ST1 and continues the process to return the sprung mass damping control amount adjusting gain K(s) to the reference value in step ST7. If, on the other hand, the sprung mass damping control amount adjusting gain K(s) has returned to the reference value, the sprung mass damping control amount responsiveness compensating portion 5d lowers the restriction history flag (i.e., turns the restriction history flag off) (step ST9) and ends this cycle of the routine.

In this way, when there is a possibility that the waveform of the demodulated signal may become distorted when the modulation method switches to the overmodulation PWM control method, the sprung mass damping control system of this second example embodiment restricts sprung mass damping control by reducing the sprung mass damping control amount adjusting gain K(s) from the reference value to reduce the final sprung mass damping control torque Twc so that it is less than the reference sprung mass damping control torque Twc0. That is, this sprung mass damping control system restricts sprung mass damping control by adjusting the amplitude of the sprung mass damping control signal relating to the sprung mass damping control amount, which it does by adjusting the sprung mass damping control amount adjusting gain K(s) according to the modulation method. Accordingly, this sprung mass damping control reduces or eliminates variation in the output responsiveness of the sprung mass damping control amount between the overmodulation PWM control method and the other modulation method. Therefore, the sprung mass damping control system of this second example embodiment is able to compensate for variation in the output responsiveness of the sprung mass damping control amount of each modulation method, regardless of the type of modulation method. As a result, the desired sprung mass damping control can be executed throughout the entire command torque and vehicle speed ranges.

Here in the example given above, the final sprung mass damping control torque Twc (i.e., the sprung mass damping control amount) is kept low by adjusting the sprung mass damping control amount adjusting gain K(s). Alternatively, however, upper and lower limit guard values or a rate limit that restricts the sprung mass damping control amount may be used instead of that sprung mass damping control amount adjusting gain K(s). For example, the sprung mass damping control amount may be either a positive value or a negative value, so the upper and lower limit guard values may be such that the upper limit is a positive value and the lower limit is a negative value. When it is determined in step ST3 that the amplitude and the frequency are not within their respective predetermined ranges, these upper and lower limit guard values are such that the width between the upper value and the lower value is large so as not to restrict the sprung mass damping control amount. Here, the upper limit and the lower limit at this time will be references. If it is determined in step ST3 that the amplitude and the frequency are within their respective predetermined ranges and the sprung mass damping control amount is a positive value, the sprung mass damping control amount responsiveness compensating portion 5d changes at least the upper limit value of the reference upper and lower limit guard values to a small value. If, on the other hand, it is determined in step ST3 that the amplitude and the frequency are within their respective predetermined ranges and the sprung mass damping control amount is a negative value, the sprung mass damping control amount responsiveness compensating portion 5d changes at least the lower limit value of the reference upper and lower limit guard values to a large value.

Also, if there are three or more modulation methods, including the overmodulation PWM control method, the same phase compensation as in the first example embodiment may be executed when the modulation method is a modulation method other than the overmodulation PWM control method.

Incidentally, in the each of the first and second example embodiments described above, the vehicle described is a hybrid vehicle or an electric vehicle that performs sprung mass damping control by controlling the motor-generator control amount of a motor-generator (i.e., the second motor-generator 32) provided as a drive source. However, the invention described in the each of the first and second example embodiments is not necessarily limited to this.

For example, in a hybrid vehicle or an electric vehicle provided with a motor that is driven by a waveform signal as a drive source, sprung mass damping control may be executed by adjusting the motor control amount (i.e., the driving control amount) of the motor. This sprung mass damping control is executed by a motor control device (i.e., a drive source control device) that controls the motor. This vehicle is provided with a sprung mass damping control amount adjusting apparatus similar to that in the first and second example embodiments, which adjusts the phase or the amplitude of the sprung mass damping control sprung mass damping control signal related to the sprung mass damping control amount, according to the waveform signal (i.e., the waveform signal modulation method). Furthermore, in a hybrid vehicle or an electric vehicle provided with a generator capable of operating as a motor driven by a waveform signal, as a drive source, sprung mass damping control may also be executed by adjusting the motor control amount (i.e., the driving control amount) of the generator. This sprung mass damping control is executed by a generator control device (i.e., drive source control device) that controls the generator. This vehicle is also provided with a sprung mass damping control amount adjusting apparatus similar to that in the first and second example embodiments, which adjusts the phase or the amplitude of the sprung mass damping control sprung mass damping control signal related to the sprung mass damping control amount, according to the waveform signal (i.e., the waveform signal modulation method).

Also, in the first and second example embodiment, phase compensation of the sprung mass damping control amount is executed to match the change in the responsiveness of the output from the difference between the modulation methods of the motor-generator. However, the factors behind the change in the responsiveness of the drive source are not necessarily limited to those described above.

For example, the responsiveness of the output of the motor-generator, the responsiveness of the output of the motor, and the responsiveness of the output of the generator are all inherently different and also change depending on and the surrounding temperature and the like. Therefore, the sprung mass damping control systems in the first and second example embodiments described above may also advance the phase of the sprung mass damping control amount by executing phase compensating control of the sprung mass damping control amount similar to that in the first and second example embodiments at this time.

Further, the responsiveness of the output of the motor-generator, the motor, and the generator may decrease when the state-of-charge (SOC) of the battery 41. Therefore, because the output responsiveness of the sprung mass damping control amount may also decrease when the responsiveness of the output of the motor-generator, the motor, and the generator decreases, the sprung mass damping control amount adjusting apparatus in each of the first and second example embodiments described above may also advance the phase of the sprung mass damping control amount by executing phase compensating control of the sprung mass damping control amount similar to that of the first and second example embodiments at that time.

Also, when the engine 10 is a gasoline engine that uses gasoline fuel, the responsiveness of the output of the engine 10 decreases when the engine 10 is operating at low speed and high torque and the torque change gradient at that time is large, so the output responsiveness of the sprung mass damping control amount may also decrease. Therefore, the sprung mass damping control amount adjusting apparatus in each of the first and second example embodiments described above may advance the phase of the sprung mass damping control amount by executing phase compensating control of the sprung mass damping control amount similar to that of the first and second example embodiments in that situation. Also, when the engine 10 is a diesel engine that uses light diesel oil, the responsiveness of the output of the engine 10 decreases when the engine 10 is operating at low speed, so the output responsiveness of the sprung mass damping control amount may also decrease. Therefore, the sprung mass damping control amount adjusting apparatus in each of the first and second example embodiments described above may advance the phase of the sprung mass damping control amount by executing phase compensating control of the sprung mass damping control amount similar to that of the first and second example embodiments in that situation.

Here, the sprung mass damping control may also be performed by adjusting the engine control amount of the engine 10. In this case, the engine control device 4 also functions as a sprung mass damping control executing device that executes sprung mass damping control. The sprung mass damping control amount adjusting apparatus performs phase compensating control of the sprung mass damping control amount when the operating state of the engine 10 matches at least one of the operating states described above. Therefore, this phase compensating control of the sprung mass damping control amount may be applied not only to a hybrid vehicle having the engine 10 (a gasoline engine or a diesel engine) and a motor-generator (in this case the second motor-generator 32), but also to a so-called gasoline or diesel vehicle that has only the engine 10 as the drive source.

Also, sprung mass damping control may be performed by adjusting both the engine control amount of the engine 10 and the motor-generator control amount of the motor-generator. In this case, the engine 10 has worse output responsiveness than the motor-generator doe, so there is a possibility that the output responsiveness of the sprung mass damping control amount may decrease as the sprung mass damping control amount on the engine increases. Accordingly, the sprung mass damping control amount adjusting apparatus of each in the first and second example embodiments described above may also advance the phase of the sprung mass damping control amount by executing phase compensating control of the sprung mass damping control amount similar to that in the first and second example embodiments in that situation.

Also, regardless of the type of vehicle (e.g., whether the vehicle is a hybrid vehicle or a gasoline vehicle or the like), when it is traveling with a low speed established in the transmission, the resonant frequency is low so there is a possibility that the responsiveness with which the driving control amount of that transmission is transmitted to the driving wheels WL and WR (hereinafter referred to as the "transmission responsiveness") may decrease. Therefore, the transmission responsiveness of the driving control amount of a driving control amount transmitting apparatus that includes the transmission (such as the power split device 20 and the power transmission device 50) decreases, so there is a possibility that the output responsiveness of the sprung mass damping control amount will also decrease at this time. Accordingly, the sprung mass damping control amount adjusting apparatus in each of the first and second example embodiments described above may also advance the phase of the sprung mass damping control amount by executing phase compensating control of the sprung mass damping control amount similar to that in the first and second example embodiments at this time.

While various examples of changing the responsiveness of the drive source and the driving control amount transmitting apparatus have been described above, phase compensating control of the sprung mass damping control amount can also be executed other cases when changing the responsiveness of at least one of the drive source or the driving control amount transmitting apparatus. That is, in a vehicle that suppresses sprung mass vibration by outputting the driving control amount of the drive source over which at least a waveform signal that is based on fluctuation in the wheel speed due to bumps and dips in the road surface has been superimposed and thus suppressing that fluctuation, when the responsiveness of at least one of the drive source or a driving control amount transmitting apparatus that transmits the driving control amount output from the drive source to the driving wheels is less than a given reference responsiveness, the phase of that waveform signal may be advanced compared with when that reference responsiveness is high. As a result, the sprung mass damping control amount is appropriately adjusted to compensate for variation in the output responsiveness of the sprung mass damping control, thereby enabling the desired sprung mass damping control to be executed.

As described above, the sprung mass damping control system of a vehicle and the vehicle according to the invention are useful as technology the suppresses a decrease in accuracy of sprung mass damping control.

The invention claimed is:

1. A sprung mass damping control system of a vehicle, which suppresses sprung mass vibration generated in a vehicle body by adjusting a driving control amount of a drive source, comprising:

a spring vibration control amount calculating device that sets a sprung mass damping control amount for suppressing the sprung mass vibration;

a drive source control device that executes sprung mass damping control by controlling the driving control amount of the drive source to realize the sprung mass damping control amount; and a sprung mass damping control amount adjusting apparatus that adjusts the phase of a sprung mass damping control signal related to the sprung mass damping control amount according to the situation, wherein the drive source control device executes sprung mass damping control by controlling a motor-generator control amount of a motor-generator that is driven by a waveform signal, or a motor control amount of a motor or a generator capable of operating as a motor that is driven by the waveform signal, and the sprung mass damping control amount adjusting apparatus adjusts the phase of the sprung mass damping control signal related to the sprung mass damping control amount according to the waveform signal, and the phase of the waveform signal is shifted when the responsiveness of at least one of the drive source or a driving control amount transmitting apparatus that transmits a driving control amount output from the drive source to a driving wheel decreases.

2. The sprung mass damping control system according to claim 1, wherein the drive source control device executes sprung mass damping control by controlling a motor-generator control amount of a motor-generator, the waveform signal modulation method of which is able to be switched, or a motor control amount of a motor or a generator capable of operating as a motor, the waveform signal modulation method of which is able to be switched, and the sprung mass damping control amount adjusting apparatus adjusts the phase of the sprung mass damping control signal related to the sprung mass damping control amount according to the modulation method.

3. The sprung mass damping control system according to claim 2, wherein the sprung mass damping control amount adjusting apparatus reduces the sprung mass damping control amount when the modulation method is an overmodulation PWM control method and the frequency of the sprung mass damping control signal according to the sprung mass damping control amount is within the predetermined range.

4. The sprung mass damping control system according to claim 1, wherein the drive source control device executes sprung mass damping control by controlling a motor-generator control amount of a motor-generator, the waveform signal modulation method of which is able to be switched, or a motor control amount of a motor or a generator capable of operating as a motor, the waveform signal modulation method of which is able to be switched, and the sprung mass damping control amount adjusting apparatus adjusts the sprung mass damping control amount when the frequency of the sprung mass damping control signal according to the sprung mass damping control amount is within a predetermined range.

5. A method of performing a sprung mass damping control in a vehicle, comprising:
  superimposing a waveform signal, based on fluctuation in wheel speed due to bumps and dips in a road surface, over a driving control amount of a drive source using a control unit;
  outputting the driving control amount of the drive source to a driving wheel using a driving control amount transmitting apparatus;
  suppressing at least the fluctuation in wheel speed; and
  shifting the phase of the waveform signal when the responsiveness of at least one of the drive source or a driving control amount apparatus that transmits the driving control amount from the drive source to the driving wheel decreases.

* * * * *